US011890830B2

(12) United States Patent
Wetsch et al.

(10) Patent No.: US 11,890,830 B2
(45) Date of Patent: Feb. 6, 2024

(54) STRAP ASSEMBLY ON STOCK MATERIAL UNITS FOR A DUNNAGE CONVERSION MACHINE

(71) Applicant: Pregis Innovative Packaging LLC, Deerfield, IL (US)

(72) Inventors: Thomas D. Wetsch, Naples, FL (US); Eric C. Wright, Bollingbrook, IL (US)

(73) Assignee: Pregis Innovative Packaging LLC, Chicago, IL (US)

( * ) Notice: Subject to any disclaimer, the term of this patent is extended or adjusted under 35 U.S.C. 154(b) by 0 days.

(21) Appl. No.: 17/194,874

(22) Filed: Mar. 8, 2021

(65) Prior Publication Data

US 2021/0187892 A1 Jun. 24, 2021

Related U.S. Application Data

(63) Continuation of application No. 15/592,723, filed on May 11, 2017, now Pat. No. 10,940,659.

(51) Int. Cl.

| | |
|---|---|
| ***B31D 5/00*** | (2017.01) |
| ***B65D 71/02*** | (2006.01) |
| ***B65D 85/67*** | (2006.01) |
| ***B65H 20/02*** | (2006.01) |
| ***B65B 27/08*** | (2006.01) |

(52) U.S. Cl.

CPC ........... *B31D 5/006* (2013.01); *B31D 5/0043* (2013.01); *B65D 71/02* (2013.01); *B65D 85/67* (2013.01); *B65H 20/02* (2013.01); *B31D 2205/0035* (2013.01); *B65B 27/08* (2013.01); *B65H 2701/11231* (2013.01); *B65H 2701/1824* (2013.01); *B65H 2801/63* (2013.01)

(58) Field of Classification Search

CPC ............ B65H 20/02; B65H 2701/1824; B65D 85/67; B65D 71/02; B65D 27/08; B31D 5/0043; B31D 5/006

USPC ...... 206/494, 425, 434, 150, 83.5, 449, 451; 294/137, 156; 493/405

See application file for complete search history.

(56) References Cited

U.S. PATENT DOCUMENTS

| | | | |
|---|---|---|---|
| 532,398 | A | 1/1895 | Dionne |
| 1,391,433 | A | 9/1921 | Wallin |
| 2,026,282 | A | 12/1935 | Leguillon |
| 2,650,703 | A | 9/1953 | Leif |
| 3,001,735 | A | 9/1961 | Francik |
| 3,052,146 | A | 9/1962 | Glendening |
| 3,265,241 | A | 8/1966 | McColgan |
| 3,330,409 | A | 7/1967 | Jorgensen |
| 3,509,797 | A | 5/1970 | Johnson |
| 3,509,798 | A | 5/1970 | Johnson |
| 3,542,268 | A | 11/1970 | Schramm |
| 3,787,264 | A | 1/1974 | Underwood |
| 3,987,901 | A | 10/1976 | Dullinger |

(Continued)

FOREIGN PATENT DOCUMENTS

| | | | |
|---|---|---|---|
| CH | 708423 | A2 | 2/2015 |
| CN | 1192178 | A | 9/1998 |

(Continued)

*Primary Examiner* — Chun Hoi Cheung

(74) *Attorney, Agent, or Firm* — Fox Rothschild LLP

(57) ABSTRACT

Stock material units that may be used in a dunnage conversion machine. For example, stock material units include sheet material that may be fed into the dunnage conversion machine and may be converted thereby into dunnage.

25 Claims, 18 Drawing Sheets

(56) References Cited

U.S. PATENT DOCUMENTS

| | | | |
|---|---|---|---|
| 4,022,396 | A | 5/1977 | Manchester et al. |
| 4,450,996 | A | 5/1984 | Kamp |
| 4,598,531 | A | 7/1986 | Ruff et al. |
| 4,699,609 | A | 10/1987 | Komaransky et al. |
| 4,830,186 | A | 5/1989 | George et al. |
| 5,078,311 | A | 1/1992 | Taguchi et al. |
| 5,131,903 | A | 7/1992 | Levine et al. |
| 5,174,449 | A | 12/1992 | Ball |
| 5,188,581 | A | 2/1993 | Baldacci |
| 5,219,126 | A | 6/1993 | Schutz |
| 5,222,601 | A | 6/1993 | Takahashi et al. |
| 5,232,430 | A | 8/1993 | Nitsch |
| 5,282,545 | A | 2/1994 | White |
| 5,310,056 | A | 5/1994 | Ball |
| 5,322,477 | A | 6/1994 | Armington et al. |
| 5,377,570 | A | 1/1995 | Giljam |
| 5,387,173 | A | 2/1995 | Simmons, Jr. |
| 5,439,730 | A | 8/1995 | Kelly et al. |
| 5,474,250 | A | 12/1995 | Birkmann et al. |
| 5,477,965 | A | 12/1995 | Herbeck |
| 5,643,167 | A | 7/1997 | Simmons |
| 5,829,231 | A | 11/1998 | Harding et al. |
| 5,864,484 | A | 1/1999 | Harding |
| 5,882,767 | A | 3/1999 | Simmons, Jr. |
| 5,897,051 | A | 4/1999 | Tessier et al. |
| 5,979,700 | A | 11/1999 | Suess |
| 6,007,016 | A | 12/1999 | Helton |
| 6,015,374 | A | 1/2000 | Murphy et al. |
| 6,033,353 | A | 3/2000 | Lencoski et al. |
| 6,168,847 | B1 | 1/2001 | Murphy et al. |
| 6,179,765 | B1 | 1/2001 | Toth |
| 6,202,889 | B1 | 3/2001 | Veith |
| 6,209,819 | B1 | 4/2001 | Habisreitinger et al. |
| 6,237,449 | B1 | 5/2001 | Orlosky |
| 6,378,800 | B1 | 4/2002 | Apichom |
| 6,524,230 | B1 | 2/2003 | Harding et al. |
| 6,632,165 | B1 | 10/2003 | Letourneau et al. |
| 6,632,311 | B1 | 10/2003 | Glenna et al. |
| 6,695,247 | B2 | 2/2004 | Widlund |
| 6,702,212 | B2 | 3/2004 | Abba et al. |
| 6,756,096 | B2 | 6/2004 | Harding |
| 6,790,302 | B2 | 9/2004 | Beck et al. |
| 6,802,467 | B2 | 10/2004 | Abba et al. |
| 6,887,329 | B2 | 5/2005 | Harding |
| 6,910,997 | B1 | 6/2005 | Yampolsky et al. |
| 6,918,489 | B2 | 7/2005 | Harding et al. |
| 6,981,352 | B2 | 1/2006 | Chow et al. |
| 7,066,422 | B1 | 6/2006 | Slocum |
| 7,186,208 | B2 | 3/2007 | Demers et al. |
| 7,350,741 | B1 | 4/2008 | Rosa |
| 7,407,471 | B2 | 8/2008 | Demers et al. |
| 7,479,100 | B2 | 1/2009 | Toth |
| 7,481,163 | B2 | 1/2009 | Theilacker |
| 7,484,341 | B2 | 2/2009 | Konno |
| 7,585,268 | B2 | 9/2009 | Cheich et al. |
| 7,614,994 | B2 | 11/2009 | Harding et al. |
| 7,651,455 | B2 | 1/2010 | Yampolsky et al. |
| 7,695,037 | B2 * | 4/2010 | Rhodes .................. B65D 71/02 294/137 |
| 7,789,819 | B2 | 9/2010 | Slovencik |
| 7,794,382 | B2 | 9/2010 | Cheich |
| 7,815,989 | B2 | 10/2010 | Cheich |
| 8,016,735 | B2 | 9/2011 | Wetsch et al. |
| 8,425,393 | B2 | 4/2013 | Cheich |
| 8,554,363 | B2 | 10/2013 | Sperry et al. |
| 8,555,761 | B2 | 10/2013 | Keily et al. |
| 8,708,882 | B2 | 4/2014 | Chan et al. |
| 8,813,953 | B2 | 8/2014 | Wegener et al. |
| 8,820,238 | B2 | 9/2014 | Brandenburg et al. |
| 8,900,111 | B2 | 12/2014 | Wetsch et al. |
| 9,505,549 | B2 | 11/2016 | Yap et al. |
| 9,533,465 | B2 | 1/2017 | Lintala et al. |
| 9,567,121 | B2 | 2/2017 | Aya |
| 10,875,733 | B2 | 12/2020 | Dominak |
| 2002/0066689 | A1 | 6/2002 | Lando |
| 2002/0100539 | A1 | 8/2002 | Harding |
| 2002/0139890 | A1 | 10/2002 | Toth |
| 2003/0073558 | A1 | 4/2003 | Chesterson et al. |
| 2003/0092552 | A1 | 5/2003 | Armington et al. |
| 2003/0181881 | A1 | 9/2003 | Makolin et al. |
| 2003/0216236 | A1 | 11/2003 | Harding et al. |
| 2004/0142806 | A1 | 7/2004 | Coppus et al. |
| 2005/0155714 | A1 | 7/2005 | Adams |
| 2005/0181924 | A1 | 8/2005 | Demers et al. |
| 2005/0247220 | A1 | 11/2005 | Brandenburg et al. |
| 2006/0138273 | A1 | 6/2006 | Reinke |
| 2007/0117703 | A1 | 5/2007 | Cavaliere et al. |
| 2007/0117704 | A1 | 5/2007 | Toth |
| 2007/0119725 | A1 | 5/2007 | Rhodes |
| 2008/0054012 | A1 | 3/2008 | Long |
| 2008/0076653 | A1 | 3/2008 | Shaw et al. |
| 2008/0125300 | A1 | 5/2008 | Cheich et al. |
| 2008/0153685 | A1 | 6/2008 | Cheich et al. |
| 2008/0207421 | A1 | 8/2008 | Wetsch et al. |
| 2008/0261794 | A1 | 10/2008 | Slovencik |
| 2009/0026306 | A1 | 1/2009 | Kempster et al. |
| 2009/0231123 | A1 | 9/2009 | Rowell et al. |
| 2009/0258775 | A1 | 10/2009 | Chan et al. |
| 2009/0321293 | A1 | 12/2009 | Latvala |
| 2009/0325773 | A1 | 12/2009 | Cheich et al. |
| 2010/0029456 | A1 | 2/2010 | Cheich |
| 2010/0127112 | A1 | 5/2010 | Aquarius |
| 2010/0132529 | A1 | 6/2010 | Miyazaki |
| 2010/0160132 | A1 | 6/2010 | Cheich |
| 2010/0311558 | A1 | 12/2010 | Cheich |
| 2011/0052875 | A1 | 3/2011 | Wetsch et al. |
| 2011/0053750 | A1 | 3/2011 | Wetsch et al. |
| 2011/0218089 | A1 | 9/2011 | Demers et al. |
| 2012/0015132 | A1 | 1/2012 | Hasegawa et al. |
| 2012/0015793 | A1 | 1/2012 | can der Kaap |
| 2012/0035038 | A1 | 2/2012 | Lembach et al. |
| 2012/0165172 | A1 | 6/2012 | Wetsch et al. |
| 2012/0225765 | A1 | 9/2012 | Cheich et al. |
| 2012/0252648 | A1 | 10/2012 | Cheich |
| 2012/0283084 | A1 | 11/2012 | Cheich et al. |
| 2012/0329629 | A1 | 12/2012 | Wetsch et al. |
| 2013/0092716 | A1 | 4/2013 | Wetsch et al. |
| 2013/0216788 | A1 | 8/2013 | Schellenberger |
| 2013/0237398 | A1 | 9/2013 | Lintala et al. |
| 2013/0313277 | A1 | 11/2013 | Stewartson et al. |
| 2014/0015132 | A1 | 1/2014 | Rotem |
| 2014/0038805 | A1 | 2/2014 | Wetsch et al. |
| 2014/0110423 | A1 | 4/2014 | Rapala |
| 2014/0155241 | A1 | 6/2014 | Cheich et al. |
| 2014/0200127 | A1 | 7/2014 | Arora et al. |
| 2014/0274645 | A1 | 9/2014 | Wetsch et al. |
| 2014/0274647 | A1 | 9/2014 | Wetsch et al. |
| 2015/0014205 | A1 | 1/2015 | Yap et al. |
| 2016/0082685 | A1 | 3/2016 | Chan |
| 2017/0087791 | A1 | 3/2017 | Lintala et al. |
| 2018/0030314 | A1 | 2/2018 | Czerwonatis et al. |

FOREIGN PATENT DOCUMENTS

| | | | | |
|---|---|---|---|---|
| CN | 101015968 | A | 8/2007 | |
| DE | 19520907 | A1 | 1/1996 | |
| EP | 206806 | A2 | 12/1986 | |
| EP | 1026113 | A2 | 8/2000 | |
| FR | 2667854 | A1 | 4/1992 | |
| FR | 2808726 | A1 | 11/2001 | |
| GB | 2173141 | A | 10/1986 | |
| JP | S55173427 | U | 12/1980 | |
| JP | H11286357 | A | 10/1999 | |
| JP | 2010509145 | A | 3/2010 | |
| JP | 2018516184 | A | 6/2018 | |
| WO | 9425380 | A1 | 11/1994 | |
| WO | WO-9625347 | A1 * | 8/1996 | ............ B65B 13/02 |
| WO | 04039571 | A2 | 5/2004 | |
| WO | 11091414 | A2 | 7/2011 | |
| WO | 11100078 | A2 | 8/2011 | |
| WO | 12067987 | A2 | 5/2012 | |

(56) References Cited

FOREIGN PATENT DOCUMENTS

| | | | |
|---|---|---|---|
| WO | 12096756 | A1 | 7/2012 |
| WO | 12112215 | A1 | 8/2012 |
| WO | 15061635 | A1 | 4/2015 |

* cited by examiner

STRAP ASSEMBLY ON STOCK MATERIAL UNITS FOR A DUNNAGE CONVERSION MACHINE

CROSS-REFERENCE TO RELATED APPLICATIONS

The present application is continuation of U.S. patent application Ser. No. 15/592,723, filed May 11, 2017, which is incorporated herein by reference in its entirety.

TECHNICAL FIELD

This invention is in the field of packaging systems and materials. More specifically, this invention is in the field of protective packaging.

BACKGROUND

In the context of paper-based protective packaging, paper sheet is crumpled to produce dunnage. Most commonly, this type of dunnage is created by running a generally continuous strip of paper into a dunnage conversion machine that converts a compact supply of stock material, such as a roll of paper or a fanfold stack of paper, into a lower density dunnage material. The supply of stock material, such as in the case of fanfold paper, is pulled into the conversion machine from a stack that is either continuously formed or formed with discrete section connected together. The continuous strip of crumpled sheet material may be cut into desired lengths to effectively fill void space within a container holding a product. The dunnage material may be produced on an as-needed basis for a packer.

Dunnage supply material may be chainable. For example, the dunnage supply arrangement comprises a first supply unit of an elongated web of material in a high-density arrangement, where the material may be converted into a low-density dunnage, and the connecting member may include an adhesive surface for adhering to a longitudinal second end of a second supply unit of material with sufficient adhesion for pulling the material of the second supply unit into the dunnage mechanism (e.g., Publication Classification daisy chaining the two supply units together), as described in more detail in U.S. Patent Application Publication No. 2014/0038805, the entire content of which is incorporated herein by this reference.

SUMMARY OF THE INVENTION

Embodiments include a stock material unit for dunnage conversion machine. The stock material unit includes one or more material sheets that form a three-dimensional body and a strap assembly wrapped about the three-dimensional body. The strap assembly includes a base sheet that defines a first face of the strap assembly, a reinforcement member substantially continuously secured to the base sheet and extending along at least a portion of a length thereof, and an adhesive securing a first end of the strap assembly to an opposite, second end of the strap assembly to retain the dunnage in the stock material unit configuration.

The stock material unit described above may have the one or more material sheets define a fanfold stack.

The stock material unit described above may have at least one fanfold stack that is formed from a continuous sheet that includes a plurality of folds that define opposing faces that are folded along the continuous sheet.

The stock material unit described above may have the strap assembly that includes a laminate sheet bonded to the base sheet, the reinforcement member being positioned adjacent to the base sheet or the laminate sheet.

The stock material unit described above may have strap assembly that includes a first portion defining the first end and having a first width, a second portion defining the second end and having a second width, and a third portion located therebetween and having a third width that is smaller than the first width and the second width.

The stock material unit described above may have the third width that is at least 50% smaller than the first width or the second width.

The stock material unit described above may have the third portion span across a peripheral face of the three-dimensional body.

The stock material unit described above may have the one or more sheets define peripheral faces of the three-dimensional body, and the strap assembly is in contact with four of the peripheral faces of the fanfold stack.

The stock material unit described above may have the reinforcement member that is concealed between the three-dimensional body and the base sheet.

The stock material unit described above may include another strap assembly that includes another base sheet that defines a first face of the another strap assembly, another reinforcement member substantially continuously secured to the base sheet and extending along at least a portion of a length thereof, and another adhesive securing a first end of the another strap assembly to an opposite, second end of the another strap assembly to retain the dunnage in the stock material unit configuration.

Embodiments also may include a stock material unit for dunnage conversion machine. The stock material unit includes a continuous sheet of material defining a three-dimensional body and a plurality of strap assemblies wrapped about the three-dimensional body. Each of the plurality of strap assemblies includes a base sheet that defines a first face of the strap assembly, a reinforcement member substantially continuously secured to the base sheet and extending along at least a portion of a length thereof, and an adhesive securing a first end of the strap assembly to an opposite, second end of the strap assembly to retain the dunnage in the unit configuration.

The stock material unit described above may have the continuous sheet material that includes a tapered sheet section defined by a plurality of slanted folds and positioned adjacent to at least one face of the three-dimensional body.

The stock material unit described above may have the plurality of strap assemblies each of which includes at least a first strap assembly at a first location and a second strap assembly at a second location, and the tapered sheet section is located between the first strap assembly and the second strap assembly.

The stock material unit described above may have the continuous sheet material that is at least partially folded to define a fanfold.

Embodiments also may include a method of assembling a stock material unit for a dunnage conversion machine. The method includes providing one or more sheets for assembly into the unit for the dunnage conversion machine and wrapping a strap assembly about the one or more sheets. The strap assembly includes a base sheet that defines a first face of the strap assembly, a reinforcement member substantially continuously secured to the base sheet and extending along at least a portion of a length thereof, and an adhesive securing a first end of the strap assembly to an opposite, second end of the strap assembly to retain the dunnage in the stock material unit configuration.

The method described above may include includes folding a continuous sheet to form a plurality of folds that define opposing faces.

The method described above may include adhesively securing a first end of the strap assembly to a second end of the strap assembly.

The method described above may involves the strap assembly that includes a first portion defining the first end and having a first width, a second portion defining the second end and having a second width, and a third portion located therebetween and having a third width that is smaller than the first width and the second width. The method also may include positioning the third portion of the strap assembly to span across a peripheral face of the three-dimensional body.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1C:
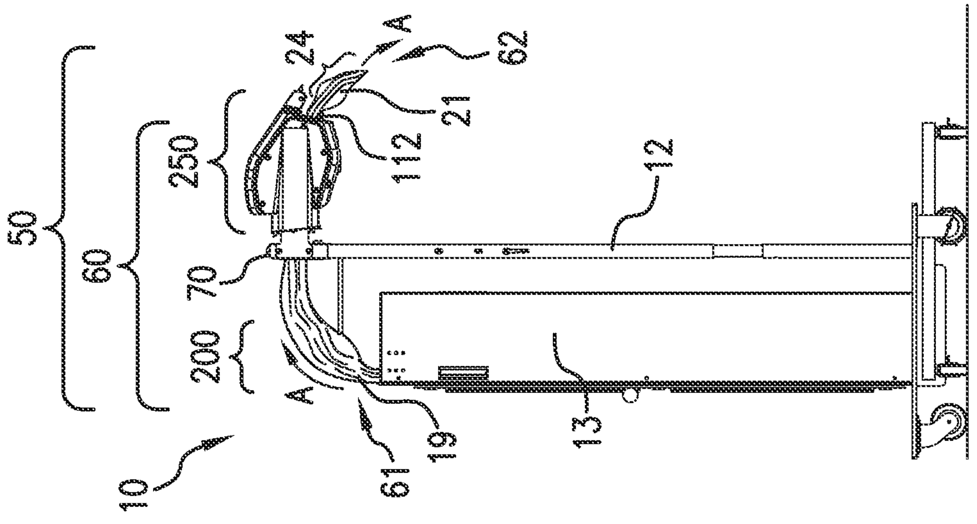
FIG. 1C is a side view of the embodiment of FIG. 1A of the conversion apparatus and supply cart holding stock material.

A system and apparatus for converting a stock material into dunnage is disclosed. The present disclosure is generally applicable to systems and apparatus where supply material, such as a stock material, is processed. The stock material is processed by longitudinal crumple machines that form creases longitudinally in the stock material to form dunnage or by cross crimple machines that forms creases transversely across the stock material. The stock material may be stored in a roll (whether drawn from inside or outside the roll), a wind, a fan-folded source, or any other form. The stock material may be continuous or perforated. The conversion apparatus is operable to drive the stock material in a first direction, which can be a dispensing direction. The conversion apparatus is fed the stock material from the repository through a drum in a dispensing direction. The stock material can be any type of protective packaging material including other dunnage and void fill materials, inflatable packaging pillows, etc. Some embodiments use supplies of other paper or fiber-based materials in sheet form, and some embodiments use supplies of wound fiber material such as ropes or thread, and thermoplastic materials such as a web of plastic material usable to form pillow packaging material.

The conversion apparatus is used with a cutting mechanism operable to sever the dunnage material. More particularly, the conversion apparatus including a mechanism for cutting or assisting the cutting of the dunnage material at desired lengths is disclosed. In some embodiments, the cutting mechanism is used with no or limited user interaction. For example, the cutting mechanism punctures, cuts, or severs the dunnage material without the user touching the dunnage material or with only minor contact of the dunnage material by the user. Specifically, a biasing member is used to bias the dunnage material against or around a cutting member to improve the ability of the system to sever the dunnage material. The biased position of the dunnage material is used in connection with or separately from other cutting features such as reversing the direction of travel of the dunnage material.

With reference to FIGS. 1A, 1B, 1C, and 2 a dunnage conversion system 10 is disclosed. The dunnage conversion system 10 may include one or more of a supply of stock material 19 and a dunnage apparatus 50. The dunnage apparatus may include one or more of a supply station 13 and a dunnage conversion machine 100. The dunnage conversion machine 100 may include one or more of a converting station 60, a drive mechanism 250, and a support 12. Generally the dunnage conversion system is operable for processing the a stock material 19. In accordance with various embodiments, the converting station 60 includes an intake 70 that receives the stock material 19 from a supply station 13. The drive mechanism 250 is able to pull or assist in pulling the stock material 19 into the intake 70. In some embodiments, the stock material 19 engages an shaping member 200 prior to the intake 70. The drive mechanism 250, in conjunction with edge 112, assists a user in cutting or severing dunnage material 21 at a desired point. The dunnage material 21 is converted from stock material 19, which is itself delivered from a bulk material supply 61 and delivered to the conversion station for converting to dunnage material 21 and then through the drive mechanism 250 and the cutting edge 112.

Figure 1B:
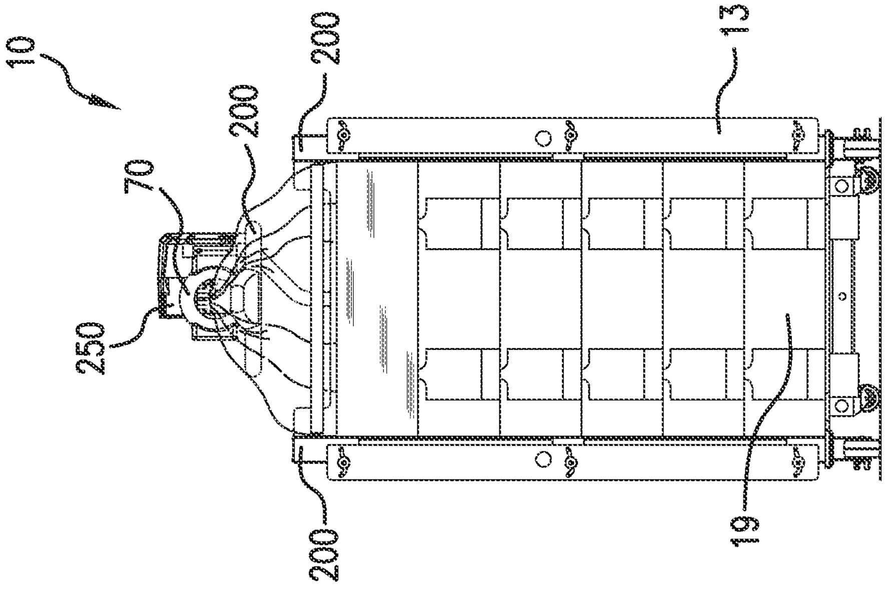
FIG. 1B is a rear view of the embodiment of FIG. 1A of the conversion apparatus and supply cart holding stock material.
Figure 1A:
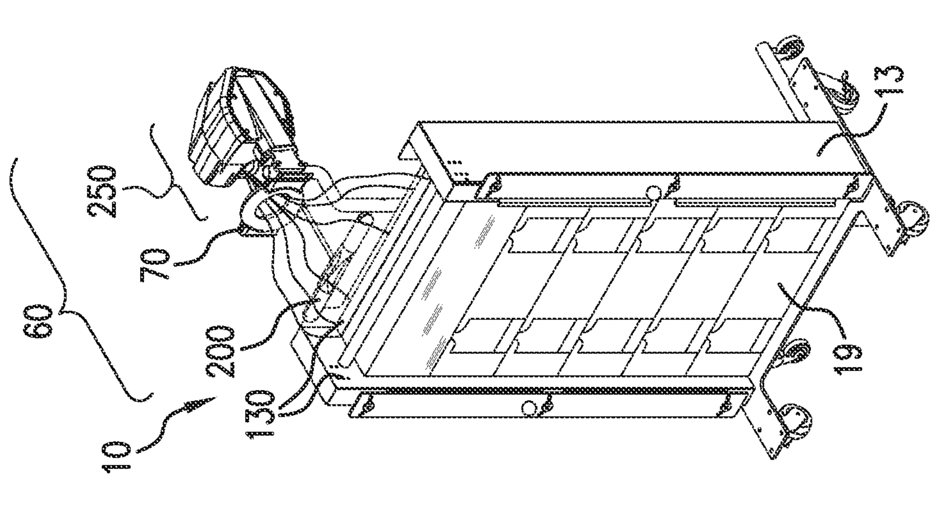
FIG. 1A is a perspective view of an embodiment of a conversion apparatus and supply cart holding stock material.

In accordance with various examples, as shown in FIGS. 1A and 1B, the stock material 19 is allocated from a bulk supply. The stock material 19 can be stored as stacked bales of fan-fold material. However, as indicated above, any other type of supply or stock material may be used. The stock material 19 can be contained in the supply station 13. In one example, the supply station 13 is a cart movable relative to the dunnage conversion system 10. The cart supports a magazine 130 suitable to contain the stock material 19. In other examples, the supply station 13 is not moveable relative to the dunnage conversion system 10. For example, the supply station 13 may be a single magazine, basket, or other container mounted to or near the dunnage conversion system 10.

The stock material 19 is fed from the supply side 61 through the intake 70. The stock material 19 begins being converted from dense stock material 19 to less dense dunnage material 21 by the intake 70 and then pulled through the drive mechanism 250 and dispensed in a dispensing direction A on the out-feed side 62 of the intake 70. The material can be further converted by the drive mechanism 250 by allowing rollers or similar internal members to crumple, fold, flatten, or perform other similar methods that further tighten the folds, creases, crumples, or other three dimension structure created by intake 70 into a more permanent shape creating the low-density configuration of dunnage material. The stock material 19 can include continuous (e.g. continuously connected stacks, rolls, or sheets of stock material), semi-continuous (e.g. separated stacks or rolls of stock material), or non-continuous (e.g. single discrete or short lengths of stock material) stock material 19 allowing for continuous, semi-continuous or non continuous feeds into the dunnage conversion system 10. Multiple lengths can be daisy-chained together. Further, it is appreciated that various structures of the intake 70 on longitudinal crumpling machines can be used, such as those intakes forming a part of the converting stations disclosed in U.S. Pat. Pub. No. 2013/0092716, U.S. Publication 2012/0165172, U.S. Publication No 2011/0052875, and U.S. Pat. No. 8,016,735. Examples of cross crumpling machines include U.S. Pat. No. 8,900,111.

In one configuration, the dunnage conversion system 10 can include a support portion 12 for supporting the station. In one example, the support portion 12 includes an inlet guide 70 for guiding the sheet material into the dunnage conversion system 10. The support portion 12 and the inlet guide 70 are shown with the inlet guide 70 extending from the post. In other embodiments, the inlet guide may be combined into a single rolled or bent elongated element forming a part of the support pole or post. The elongated element extends from a floor base configured to provide lateral stability to the converting station. In one configuration, the inlet guide 70 is a tubular member that also functions as a support member for supporting, crumpling and guiding the stock material 19 toward the drive mechanism 250. Other inlet guide designs such as spindles may be used as well.

In accordance with various embodiments, the advancement mechanism is an electromechanical drive such as an electric motor 11 or similar motive device. The motor 11 is connected to a power source, such as an outlet via a power cord, and is arranged and configured for driving the dunnage conversion system 10. The motor 11 is an electric motor in which the operation is controlled by a user of the system, for example, by a foot pedal, a switch, a button, or the like. In various embodiments, the motor 11 is part of a drive portion, and the drive portion includes a transmission for transferring power from the motor 11. Alternatively, a direct drive can be used. The motor 11 is arranged in a housing and is secured to a first side of the central housing, and a transmission is contained within the central housing and operably connected to a drive shaft of the motor 11 and a drive portion, thereby transferring motor 11 power. Other suitable powering arrangements can be used.

Figure 2:
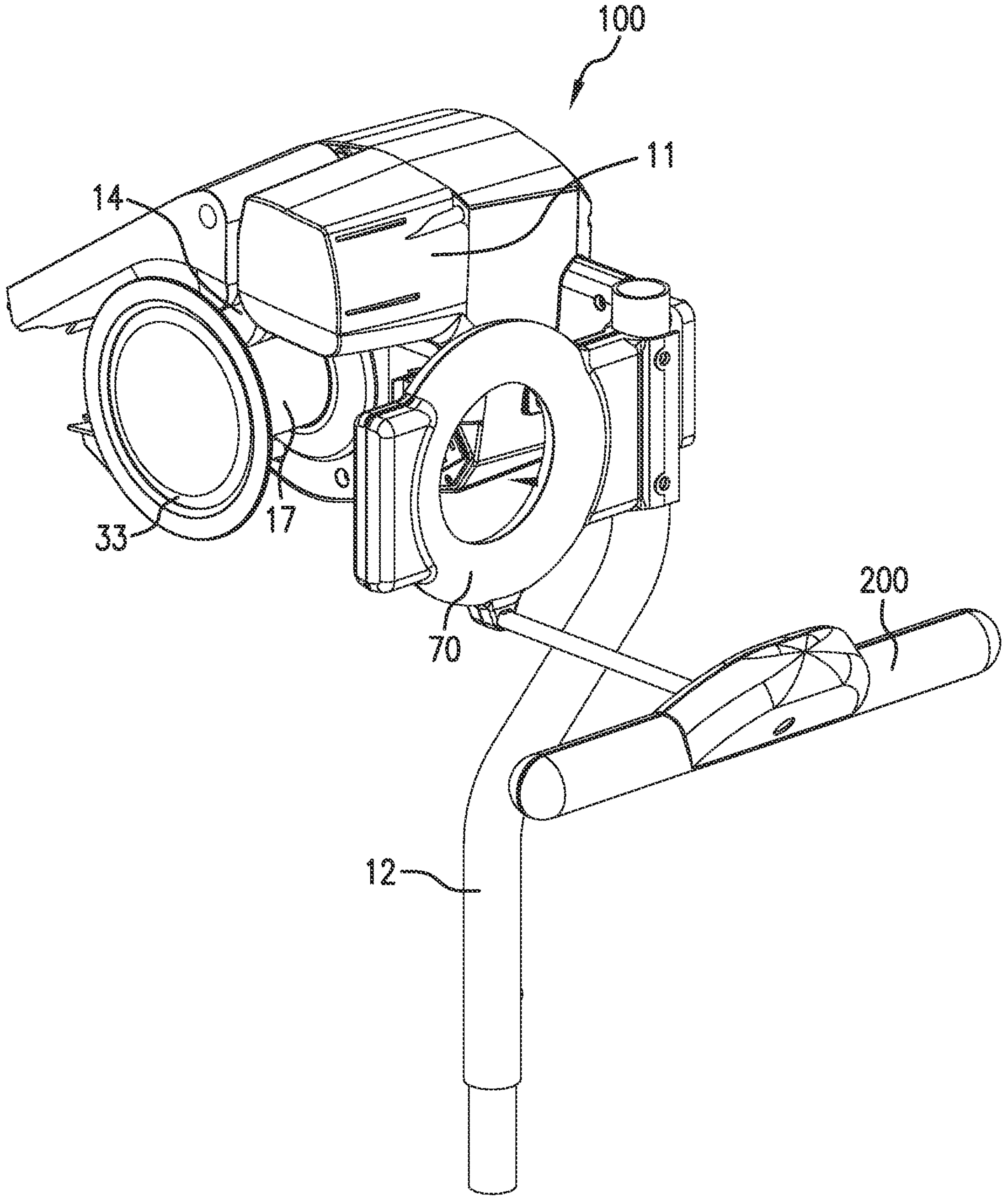
FIG. 2 is a perspective view of an embodiment of the dunnage conversion system of FIG. 1A.

The motor 11 is mechanically connected either directly or via a transmission to a drum 17, shown in FIG. 2, which causes the drum 17 to rotate with the motor 11. During operation, the motor 11 drives the drum 17 in either a dispensing direction or a reverse direction (i.e., opposite of the dispensing direction), which causes drum 17 to dispense the dunnage material 21 by driving it in the dispensing direction, depicted as arrows "A" in FIGS. 1C and 2, or withdraw the dunnage material 21 back into the conversion machine in the direction opposite of A. The stock material 19 is fed from the supply side 61 of the intake 70 and over the drum 17, forming the dunnage material 21 that is driven in the dispensing direction "A" when the motor 11 is in operation. While described herein as a drum, this element of the driving mechanism may also be wheels, conveyors, belts or any other device operable to advance stock material or dunnage material through the system.

In accordance with various embodiments, the dunnage conversion system 10 includes a pinch portion operable to press on the material as it passes through the drive mechanism 250. As an example, the pinch portion includes a pinch member such as a wheel, roller, sled, belt, multiple elements, or other similar member. In one example, the pinch portion includes a pinch wheel 14. The pinch wheel 14 is supported via a bearing or other low friction device positioned on an axis shaft arranged along the axis of the pinch wheel 14. In some embodiments, the pinch wheel can be powered and driven. The pinch wheel 14 is positioned adjacent to the drum such that the material passes between the pinch wheel 14 and the drum 17. In various examples, the pinch wheel 14 has a circumferential pressing surface arranged adjacent to or in tangential contact with the surface of the drum 17. The pinch wheel 14 may have any size, shape, or configuration. Examples of size, shape, and configuration of the pinch wheel may include those described in U.S. Pat. Pub. No. 2013/0092716 for the press wheels. In the examples shown, the pinch wheel 14 is engaged in a position biased against the drum 17 for engaging and crushing the stock material 19 passing between the pinch wheel 14 and the drum 17 to convert the stock material 19 into dunnage material 21. The drum 17 or the pinch wheel 14 is connected to the motor 11 via a transmission (e.g., a belt drive or the like). The motor 11 causes the drum or the pinch wheel to rotate.

In accordance with various embodiments, the drive mechanism 250 may include a guide operable to direct the material as it is passes through the pinch portion. In one example, the guide may be a flange 33 mounted to the drum 17. The flange 33 may have a diameter larger than the drum 17 such that the material is kept on the drum 17 as it passes through the pinch portion.

The drive mechanism 250 controls the incoming dunnage material 19 in any suitable manner to advance it from a conversion device to the cutting member. For example, the pinch wheel 14 is configured to control the incoming stock material. When the high-speed incoming stock material diverges from the longitudinal direction, portions of the stock material contacts an exposed surface of the pinch wheels, which pulls the diverging portion down onto the drum and help crush and crease the resulting bunching material. The dunnage may be formed in accordance with any techniques including ones referenced to herein or ones known such as those disclosed in U.S. Pat. Pub. No. 2013/0092716.

In accordance with various embodiments, the conversion apparatus 10 can be operable to change the direction of the stock material 19 as it moves within the conversion apparatus 10. For example, the stock material is moved by a combination of the motor 11 and drum 17 in a forward direction (i.e., from the inlet side to the dispensing side) or a reverse direction (i.e., from the dispensing side to the supply side 61 or direction opposite the dispensing direction). This ability to change direction allows the drive mechanism 250 to cut the dunnage material more easily by pulling the dunnage material 19 directly against an edge 112. As, the stock material 19 is fed through the system and dunnage material 21 it passes over or near a cutting edge 112 without being cut.

Preferably, the cutting edge 112 can be curved or directed downward so as to provide a guide that deflects the material in the out-feed segment of the path as it exits the system near the cutting edge 112 and potentially around the edge 112. The cutting member 110 can be curved at an angle similar to the curve of the drum 17, but other curvature angles could be used. It should be noted that the cutting member 110 is not limited to cutting the material using a sharp blade, but it can include a member that causes breaking, tearing, slicing, or other methods of severing the dunnage material 21. The cutting member 110 can also be configured to fully or partially sever the dunnage material 21.

In various embodiments, the transverse width of the cutting edge 112 is preferably about at most the width of the drum 17. In other embodiments, the cutting edge 112 can have a width that is less than the width of the drum 17 or greater than the width of the drum 17. In one embodiment, the cutting edge 112 is fixed; however, it is appreciated that in other embodiments, the cutting edge 112 could be moveable or pivotable. The edge 112 is oriented away from the driving portion. The edge 112 is preferably configured sufficient to engage the dunnage material 21 when the dunnage material 21 is drawn in reverse. The edge 112 can comprise a sharp or blunted edge having a toothed or smooth configuration, and in other embodiments, the edge 112 can have a serrated edge with many teeth, an edge with shallow teeth, or other useful configuration. A plurality of teeth are defined by having points separated by troughs positioned there between.

Generally, the dunnage material 21 follows a material path A as shown in FIG. 1C. As discussed above, the material path A has a direction in which the material 19 is moved through the system. The material path A has various segments such as the feed segment from the supply side 61 and severable segment 24. The dunnage material 21 on the out-feed side 62 substantially follows the path A until it reaches the edge 112. The edge 112 provides a cutting location at which the dunnage material 21 is severed. The material path can be bent over the edge 112.

As discussed above, any stock material may be used. For example, the stock material may have a basis weight of about at least 20 lbs., to about at most 100 lbs. Examples of paper used include 30 pound kraft paper. The stock material 19 comprises paper stock stored in a high-density configuration having a first longitudinal end and a second longitudinal end that is later converted into a low-density configuration. The stock material 19 is a ribbon of sheet material that is stored in a fan-fold structure, as shown in FIG. 1A, or in coreless rolls as disclosed in Pat. Pub. No. 123456. The stock material is formed or stored as single-ply or multiple plies of material. Where multi-ply material is used, a layer can include multiple plies. It is also appreciated that other types of material can be used, such as pulp-based virgin and recycled papers, newsprint, cellulose and starch compositions, and poly or synthetic material, of suitable thickness, weight, and dimensions.

In various embodiments, the stock material units may include an attachment mechanism that may connect multiple units of stock material (e.g., to produce a continuous material feed from multiple discrete stock material units). Preferably, the adhesive portion facilitates daisy-chaining the rolls together to form a continuous stream of sheet material that can be fed into the converting station 70.

Generally, the stock material 19 may be provided as any suitable number of discrete stock material units. In some embodiments, two or more stock material units may be connected together to provide a continuous feed of material into the dunnage conversion machine that feeds through the connected units, sequentially or concurrently (i.e., in series or in parallel). Moreover, as described above, the stock material units may have any number of suitable sizes and configurations and may include any number of suitable sheet materials. Generally, the term "sheet material" refers to a material that is generally sheet-like and two-dimensional (e.g., where two dimensions of the material are substantially greater than the third dimension, such that the third dimension is negligible or de minimus in comparison to the other two dimensions). Moreover, the sheet material is generally flexible and foldable, such as the example materials described herein.

In some embodiments, the stock material units may have fanfold configurations. For example, a foldable material, such as paper, may be folded repeatedly to form a stack or a three-dimensional body. The term "three-dimensional body," in contrast to the "two-dimensional" material, has three dimensions all of which are non-negligible. In an embodiment, a continuous sheet (e.g., sheet of paper, plastic, foil) may be folded at multiple fold lines that extend transversely to a longitudinal direction of the continuous sheet or transversely to the feed direction of the sheet. For example, folding a continuous sheet that has a substantially uniform width along transverse fold lines (e.g., fold lines oriented perpendicularly relative to the longitudinal direction) may form or define sheet sections that have approximately the same width. In an embodiment, the continuous sheet may be folded sequentially in opposite or alternating directions two produce an accordion-shaped continuous sheet. For example, folds may form or define sections along the continuous sheet, which may be substantially rectangular.

For example, sequentially folding the continuous sheet may produce an accordion-shaped continuous sheet with sheet sections that have approximately the same size and/or shape as one another. In some embodiments, multiple adjacent section that are defined by the fold lines may be generally rectangular and may have the same first dimension (e.g., corresponding to the width of the continuous sheet) and the same second dimension that is generally along longitudinal direction of the continuous sheet. For example, when the adjacent sections are contacting one another, the continuous sheet may be configured as a three-dimensional body or a stack (e.g., the accordion shape that is formed by the folds may be compressed, such that the continuous sheet forms a three-dimensional body or stack).

It should be appreciated that the fold lines may have any suitable orientation relative to one another as well as relative to the longitudinal and transverse directions of the continuous sheet. Moreover, the stock material unit may have transvers folds that are parallel one to another (e.g., compressing together the sections that are formed by the fold lines may form a three-dimensional body that is rectangular prismoid) and may also have one or more folds that are non-parallel relative to the transvers folds. FIGS. 3A-3H illustrate various folds of a stock material unit 300 may ((showing steps or a method acts for how at least a portion of the continuous sheet material may be folded, according to an embodiment).

Figure 3A:
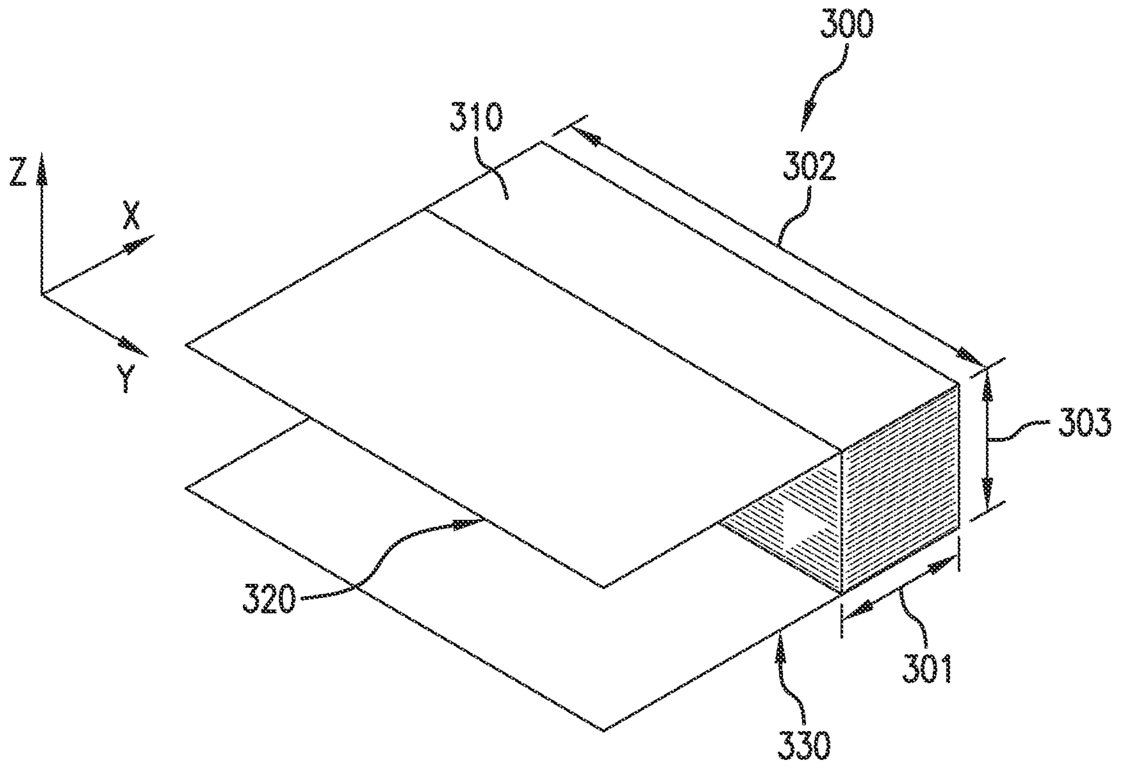
FIGS. 3A-3H is a perspective view of an embodiment of a folded stock material unit for a dunnage conversion machine, illustrating different steps involved in folding a sheet of the stock material unit.

As shown in FIG. 3A, the stock material unit 300 may define a three-dimensional body that has longitudinal, transverse, and vertical dimensions 301, 302, 303 that correspond to the longitudinal, transverse, and vertical directions of the stock material unit 300. For ease of description, axes X, Y, and Z are identified on FIG. 3A and correspond to the orientation of a continuous sheet from which the stock material unit 300 may be formed as well as to the longitudinal, transverse, and vertical directions. Specifically, X-axis corresponds to the longitudinal direction of the continuous sheet (e.g., feed direction) and to the longitudinal dimension 301 of the stock material unit 300; Y-axis corresponds to the transverse direction of the continuous sheet and to the transverse dimension 302 of the stock material unit 300. Moreover, the vertical dimension 303 defines the height of the stock material unit 300, which is formed when the continuous sheet is folded repeatedly in alternating directions to form multiple adjacent sections that stack together; the Z-axis is parallel to the vertical dimension 303.

Folding the continuous sheet at the transvers fold lines forms or defines generally rectangular sheet sections, such as sheet section 310. The rectangular sheet sections may stack together (e.g., by folding the continuous sheet in alternating directions) to form the three-dimensional body that has longitudinal, transverse, and vertical dimensions 301, 302, 303. Moreover, at least a portion of the continuous sheet may be folded about fold lines that are slanted relative to the transverse and/or longitudinal dimensions of the continuous sheet (e.g., non-parallel relative to the X-axis and Y-axis).

In the illustrated embodiment, a portion 320 of the continuous sheet and a portion 330 of the continuous sheet include one or more slanted folds. Moreover, in some embodiments, the portions 320 and/or 330 are larger than the sheet section 310 (e.g., perimeter of the sheet section 310 may be defined by the longitudinal and transverse dimensions 301, 302, and the perimeter of the portions 320 and/or 330 may be defined by the transverse dimension and by another dimension that is greater than the longitudinal dimension 301). Additionally or alternatively, in some embodiments, the portions 320 and 330 may be positioned on opposite sides of the three-dimensional body or may be separated from each other by a distance that is approximate the same as the vertical dimension 303 stock material unit 300 (e.g., the portions 320 and 330 may be at the opposing ends of the continuous sheet).

Figure 3B:
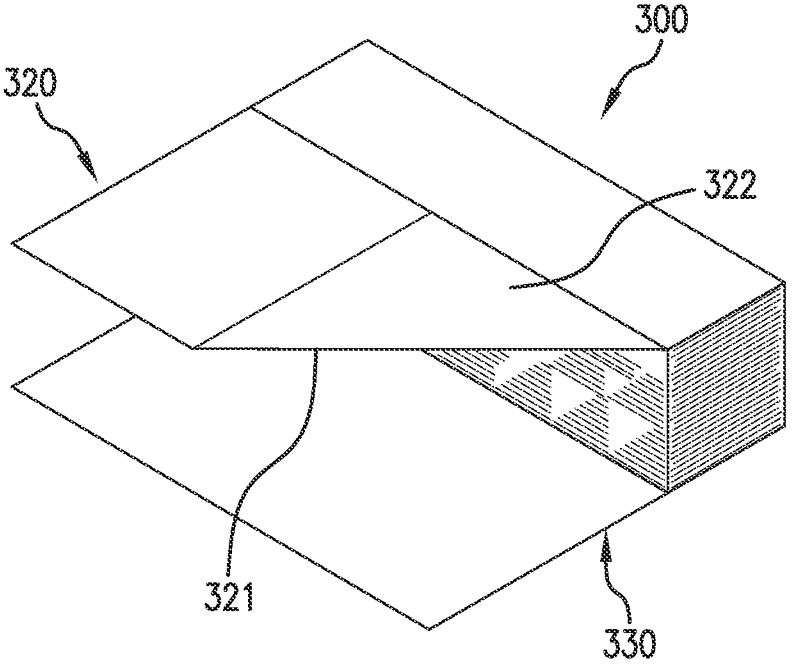

As shown in FIG. 3B, the portion 320 may be folded along a slanted fold line 321 to form a section 322. For example, the slanted fold line 321 may be non-parallel relative to the longitudinal and/or transverse directions of the continuous sheet (e.g., non-parallel relative to the X and Y axes). In the illustrated embodiment, the section 322 is generally triangular. In other embodiments, the section 322 may have other suitable shapes (e.g., the shape of the section 322 may be at least in part defined by the shape of the portion 320).

As described above, the stock material from the stock material units may be fed through the intake 70 (FIGS. 1A-2). In some embodiments, the transverse direction of the continuous sheet (e.g., direction corresponding to the transverse dimension 302 (FIG. 3A)) is greater than one or more dimensions of the intake. For example, the transverse dimension of the continuous sheet may be greater than the diameter of a generally round intake. For example, reducing the width of the continuous sheet at the start thereof may facilitate passage thereof into the intake. In some embodiments, the decreased width of the leading portion of the continuous sheet may facilitate smoother entry and/or transition or entry of a daisy-chained continuous sheet and/or may reduce or eliminate catching or tearing of the continuous sheet. Moreover, reducing the width of the continuous sheet at the start thereof may facilitate connecting together or daisy-chaining two or more stock material units. For example, connecting or daisy-chaining material with a tapered section may require smaller connectors or splice elements than for connecting a comparable sheet of full width. Moreover, tapered sections may be easier to manually align and/or connect together than full-width sheet sections.

Figure 3C:
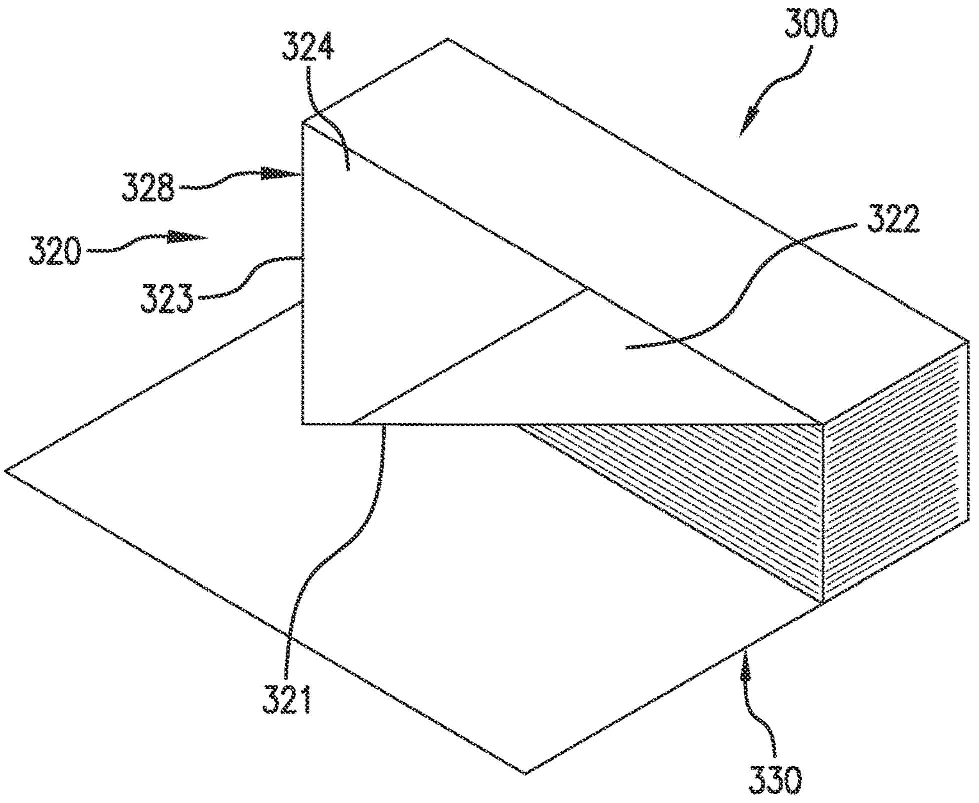
Figure 3D:
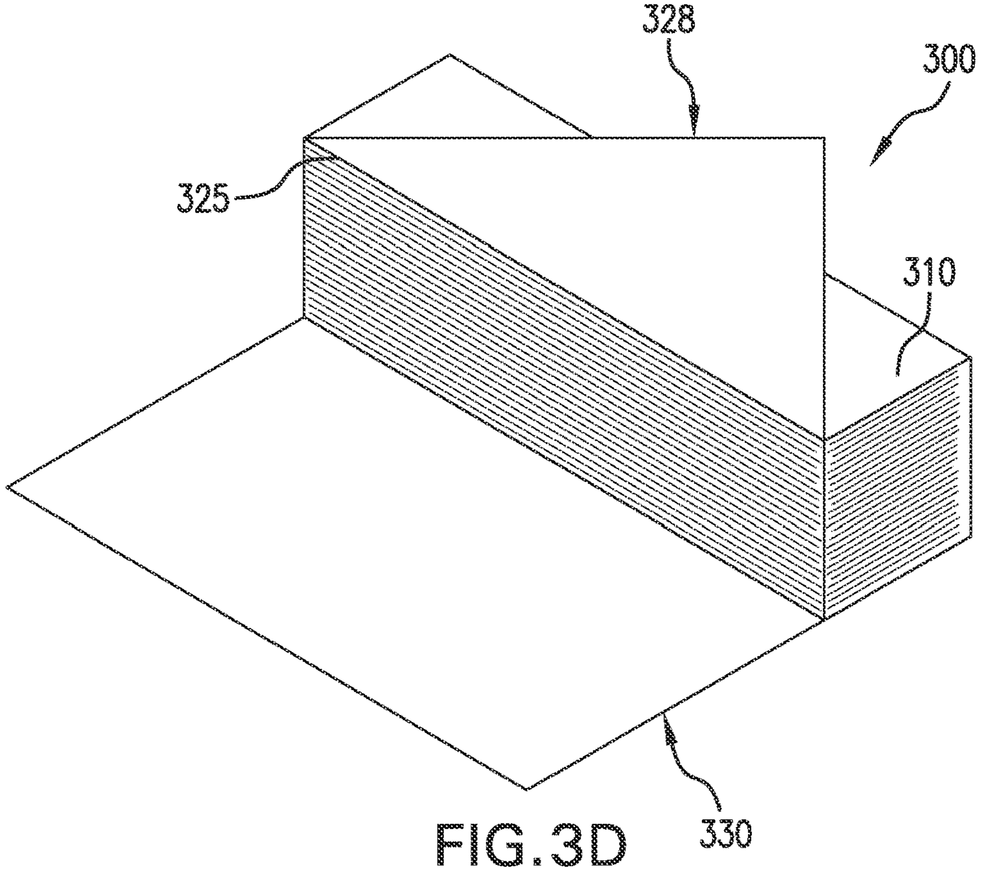

In an embodiment, as shown in FIG. 3C, the stock material unit 300 has a fold line 323 and a folded tapered section 324. Moreover, the sections 321 and 323 collectively define or form a triangular section 328 of the stock material unit 300. For example, the triangular section 328 may have multiple layers, such as caused by folding the sheet over itself, or may include multiple portions of the continuous sheet, which may define opposing faces of the tapered section.

As mentioned above, forming the triangular section 328 may facilitate connecting together or daisy-chaining multiple stock material units. Moreover, the tapered end of the triangular section 328 may facilitate initiating entry of the stock material from the stock material unit 300 into the intake of the dunnage conversion machine. In the illustrated embodiment, the stock material unit 300 is formed from a single continuous sheet of material (e.g., as described above, by folding the continuous sheet at transvers fold lines in alternating directions). Hence, for example, the triangular section 328 formed from the sections 321 and 323 generally has two layers. It should be appreciated that the triangular section 328 may have any number of layers. For example, multiple continuous sheets (e.g., overlaying one another) may be folded together at transverse fold lines (e.g., in alternating directions), and each of the sections 321 and 323 may have multiple layers that, when folded over the opposing section of the portion 320 may form a triangular section 328 with more than two layers.

In the illustrated embodiment, the section 324 is smaller than the section 321. For example, a portion of the section 324 may overlay or overlap onto the section 321. Moreover, folding the section 324 at the fold line 323 may also fold a portion of the section 321 onto itself.

The tip of the triangular section 328 may include four layers (e.g., as compared to the portion of the triangular section 328 away from the tip and closer to the base of the triangular section 328 that has two layers). For example, additional layers at the tip of the triangular section 328 may reinforce the tip (e.g., to reduce the potential of breakage at the tip, when the tip of the triangular section 328 is attached to another stock material unit). Additionally or alternatively, the peak defined by the triangular section 328 may be generally aligned with a center of the transverse dimension of the stock material unit 300.

In some embodiments, the stock material unit 300 includes a splice member or one or more portions thereof, which may be used to connect the stock material unit 300 to another stock material unit. Moreover, the triangular section 328 of the stock material unit 300 may be further folded (e.g., to accommodate storage of the stock material unit 300 and/or attachment of the stock material unit 300 to another stock material unit).

Figure 3E:
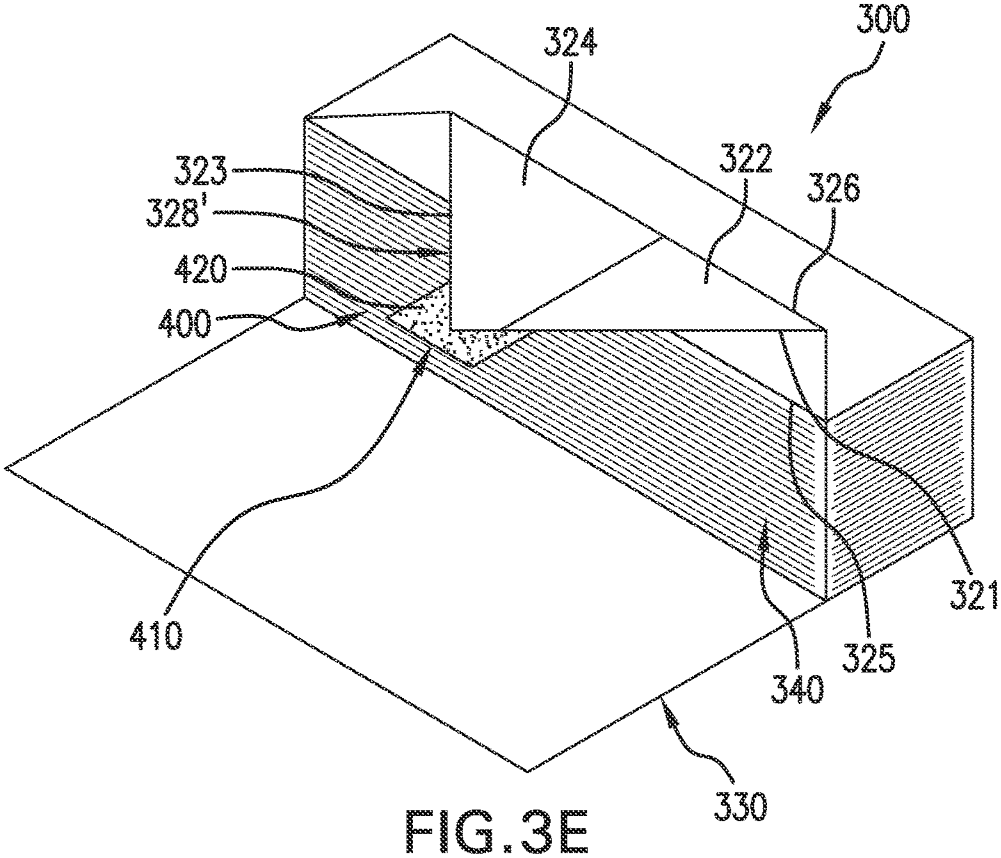

For example, as shown in FIGS. 3D-3H, the triangular section 328 (that is formed by the sections 321 and 323 (FIGS. 3A-3C)) may be first folded about fold line 325 and over sheet section 310. Moreover, as shown in FIG. 3E, a portion of the triangular section 328 may be further folded in an opposite direction about fold line 326. For example, folding a portion of the triangular section 328 about fold line 326 may form a triangular section 328' and another section that is shaped as a truncated triangle.

In some embodiments, stock material unit 300 may include a splice member 400. For example, the splice member 400 may include a base 410 and an adhesive layer 420 positioned on the base 410. The adhesive layer 420 may attach the splice member 400 to the triangular section 328. Moreover, after attaching the splice member 400 to the triangular section 328, at least a portion of the adhesive layer may be exposed.

Figure 3F:
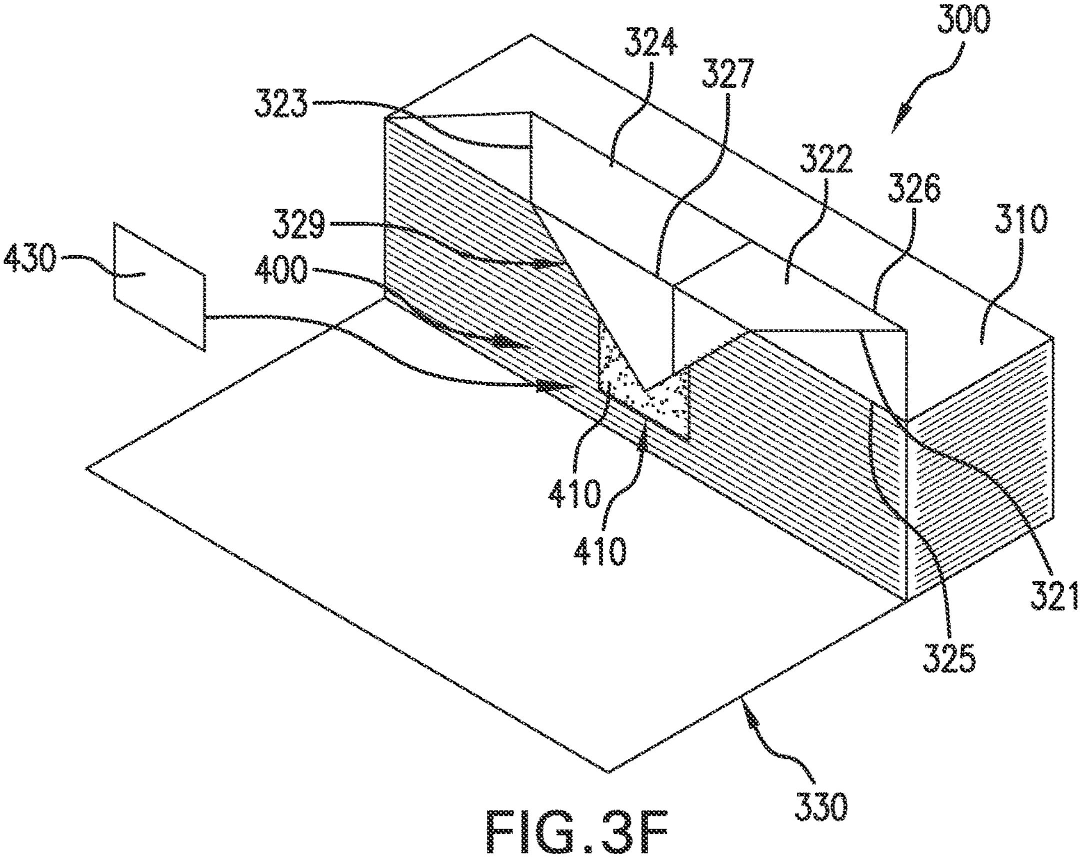

Furthermore, as shown in FIG. 3F, the triangular section 328' may be further folded over fold line 327. For example, after folding the triangular section 328' over fold line 327, a smaller triangular section 329 may be formed and may be oriented approximately perpendicular relative to the section 310 and generally parallel relative to a vertical side 340 of the stock material unit 300. Hence, for example, the section that is defined by fold lines 321, 323, 327, and 326 has a different orientation than the triangular section 329.

As discussed below in more detail, the triangular section 329 may connect to another stock material unit, to daisy-chain the stock material unit 300 and another stock material unit (e.g., to form a continuous sheet from multiple sheets of two or more stock material units). A splice member or a portion thereof (e.g., a connector) may be secured to one or more portions of the stock material unit 300.

After the above-described folding, the splice member 400 may be adhesively attached to the triangular section 329. The splice member 400 may secure the triangular section 329 to another stock material unit. For example, the adhesive layer 420 may adhere to a sheet of another stock material unit. Including the splice member 400 together with the stock material unit 300 may facilitate attachment of the stock material unit 300 to another stock material unit (e.g., the splice member 400 may be readily available for attaching the triangular section 329 to another sheet material).

In an embodiment, the splice member 400 may include a removable cover 430 that may be removably attached to the adhesive layer 420 (e.g., as indicated with an arrow in FIG. 3F). For example, attaching the removable cover 430 to the adhesive layer 420 may protect and cover the adhesive layer 420, such as to prevent unintentional attachment or adherence of the adhesive layer 420 (e.g., to one or more portions of the continuous sheet of the stock material unit 300). Moreover, as described below in more detail, the removable cover 430 may be removed from the splice member 400 to expose the adhesive layer 420 for attachment to a sheet of another stock material unit, without materially affecting the adhesive properties of the adhesive layer 420.

Figure 3G:
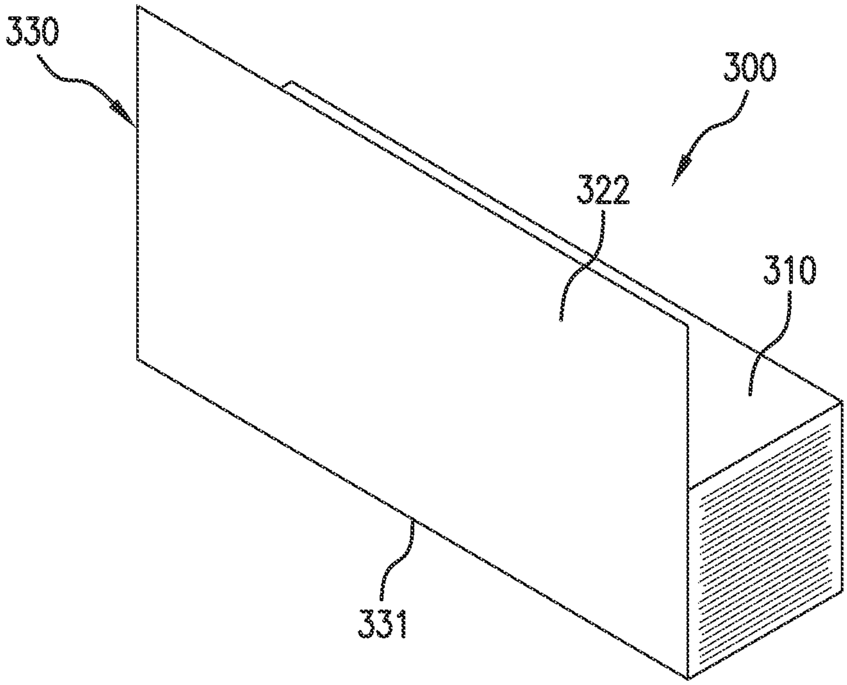
Figure 3H:
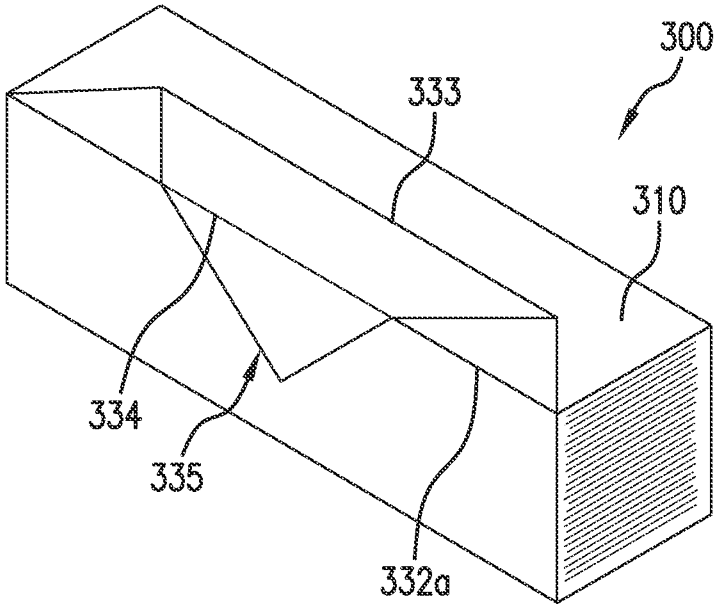

In some embodiments, the portion 330 that is near or defines the end of the continuous sheet (e.g., opposite to the triangular section 329 (FIG. 3F)). As shown in FIG. 3G, the portion 330 may be folded about fold line 331 to form section 332. Moreover, the sheet section 332 may be folded over fold line 333 and then over fold line 334, as shown in FIG. 3H. For example, the portion 330 may cover the triangular section 329 and over the splice member 400 (e.g., to cover and/or protect the triangular section 329).

For example, folding the portion 330 in the manner illustrated in FIG. 3H may form a section 335. In some embodiments, the section 335 may be generally triangular. Alternatively, the section 335 may be formed to have any number of suitable shapes (e.g., square, rectangular, etc.). Moreover, the section 335 may define or may be located at the end of the continuous sheet that forms the stock material unit 300.

Figure 4A:
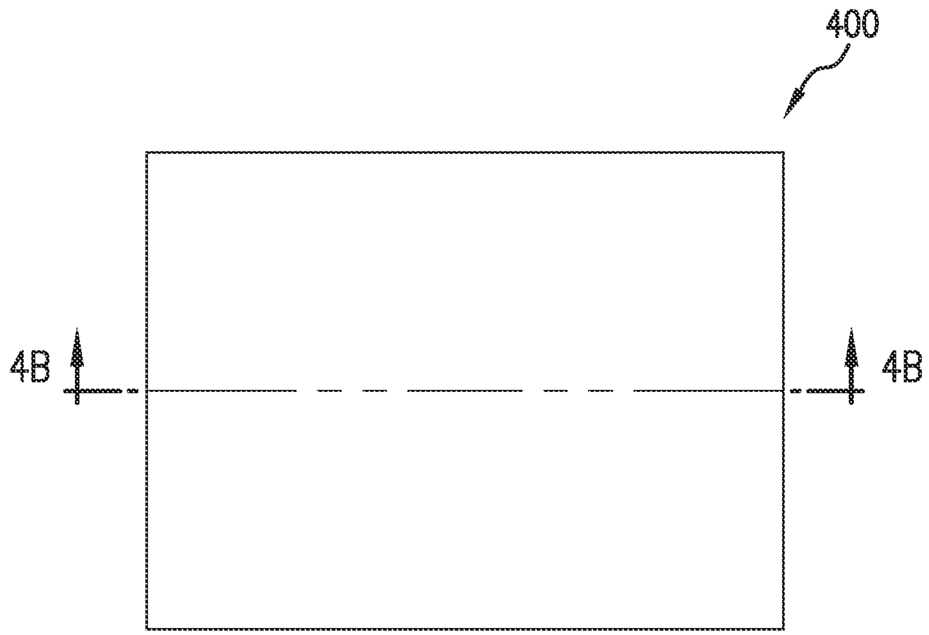
FIG. 4A is a top view of an embodiment of a splice member.
Figure 4B:
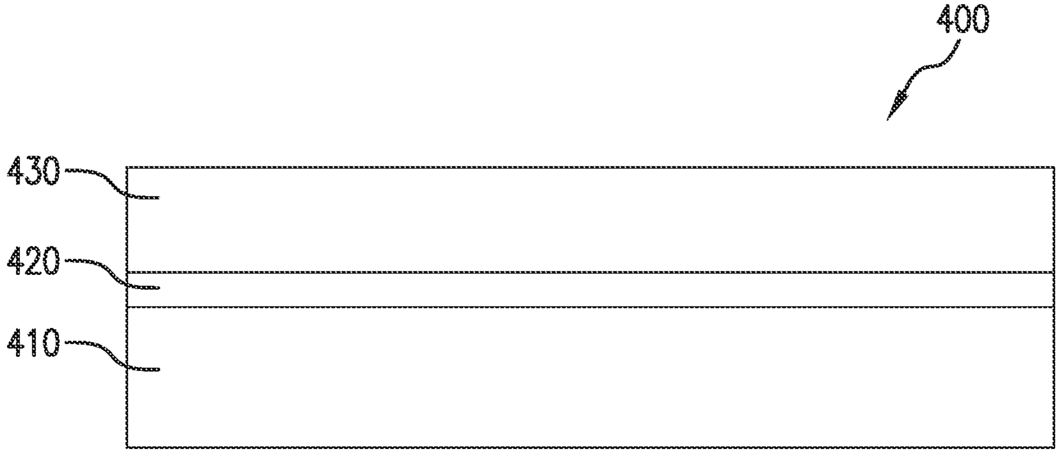
FIG. 4B is a cross-sectional view of the splice member of FIG. 4A.

As described above, the splice member 400 may be secured to a section of the stock material unit 300*a*. FIGS. 4A-4B illustrate the splice member 400 according to an embodiment. FIG. 4A is a top view of the splice member 400, and FIG. 4B is a cross-sectional view of the splice member 400, at the cross-section line indicated in FIG. 4A. In the illustrated embodiment, as described above, the splice member 400 includes the base 410, adhesive layer 420 on the base 410, and removable cover 430 that may cover the adhesive layer 420 and may be removed therefrom (e.g., without materially affecting the adhesive properties of the adhesive layer 420). For example, the removable cover 430 may include a siliconized coating.

Generally, the adhesive layer 420 may include any number of suitable adhesives that may secure the splice member 400 to the sheet of the stock material unit, as described above. For example, the adhesive layer 420 may include pressure-sensitive adhesive. The removable cover 430 may be removed from the splice member 400, thereby exposing the adhesive layer 420 under the removable cover 430. After removing the removable cover 430, the splice member 400 may be secured to the sheet of the stock material unit. Subsequently, the removable cover 430 may be replaced back onto the adhesive layer 420. Alternatively, a protective coating may be sprayed or otherwise coated onto the adhesive layer 420 to prevent unintentional adherence thereof (e.g., silicone may be sprayed onto the adhesive layer 420).

Moreover, while the splice member 400 is attached to the continuous sheet of a first stock material unit, the removable cover 430 may be again removed from the splice member 400 to expose the unattached portion of the adhesive layer 420 thereunder. For example, after removing the removable cover 430, the splice member 400 may be secured to a portion of a continuous sheet of a second stock material unit, thereby connecting together or daisy-chaining the first and second stock material units, as described below in more detail.

Figure 5:
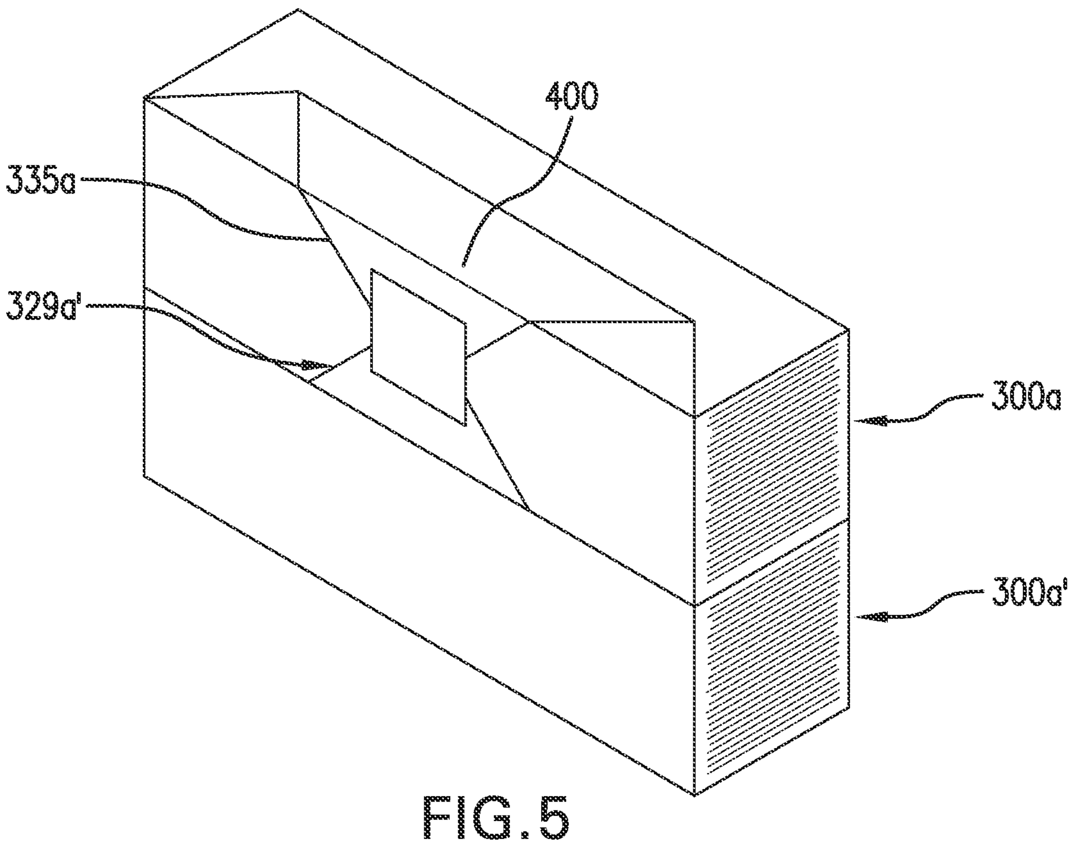
FIG. 5 is a perspective view of an embodiment of two stock material units daisy-chained together.

FIG. 5 illustrates first and second stock material units stock material units 300*a*, 300*a'* connected together or daisy-chained by the splice member 400, such that the dunnage conversion machine may continuously pull the sheet material, from the first and second stock material units 300*a*, 300*a'*. Specifically, for example, section 335*a* of the stock material unit 300*a*, which defines the bottom or end portion of the continuous sheet of the first stock material unit 300*a*, may be connected to section 329*a'* of the stock material unit 300*a'*, which may define the start or may be located at the beginning of the sheet of the second stock material unit 300*a'*.

As mentioned above, the sections 335*a* of the stock material unit 300*a* and 329*a*' of the stock material unit 300*a*' may have generally triangular shapes. Moreover, because sections 335*a* and 329*a*' may have multiple folds and may include multiple layers, these multiple folds can provide reinforcement to sections 335*a* and 329*a*' to prevent or minimize tearing or failure of the connected sections (e.g., as the second stock material unit 300*a*' is pulled into the intake 70 (FIGS. 1A-2)). In the illustrated embodiment, the splice member 400 may have a first portion of the adhesive layer connected to the section 335*a* and a second, different portion of the adhesive layer connected to the section 329*a*', thereby connecting together or daisy-chaining the stock material unit 300*a* and the stock material unit 300*a'*.

As described above, the dunnage conversion machine may include a supply station (e.g., supply station 13 (FIGS. 1A-2)). For example, each of the stock material units 300*a* and 300*a*' may be placed into the supply station individually and subsequently may be connected together after placement. Hence, for example, each of the stock material units 300*a* and 300*a*' may be suitable sized to facilitate lifting and placement thereof by an operator. Moreover, any number of stock material units may be connected or daisy-chained together. For example, connecting together or daisy-chaining multiple stock material units may produce a continuous supply of material.

Figure 6A:
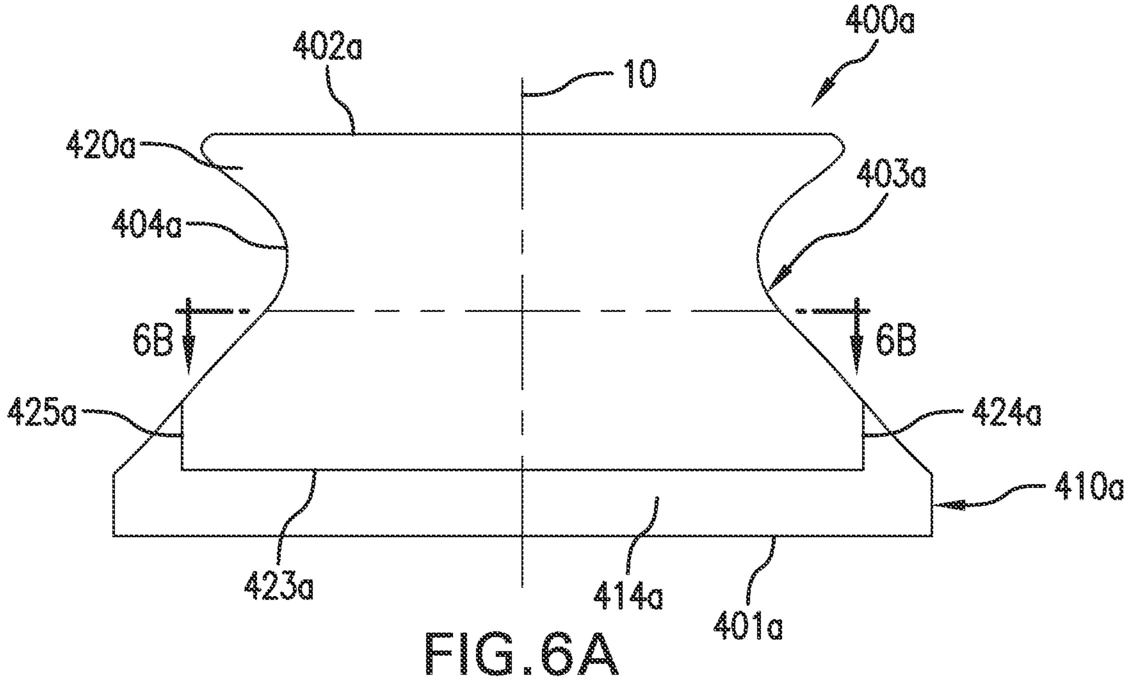
FIG. 6A is a top view of an embodiment of a splice member.
Figure 6B:
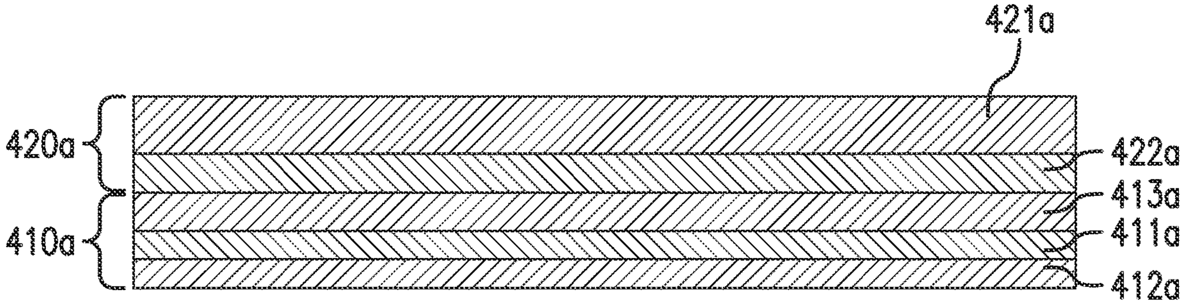
FIG. 6B is a cross-sectional view of the splice member of FIG. 4A.

Generally, the splice member may have any number of suitable configurations (e.g., configuration of the splice member may dependent on the configuration of the stock material units and/or folds thereof). In at least one embodiment, the splice member may include multiple adhesive surfaces that may facilitate securing the splice member to the stock material unit as well as securing together two stock material units. FIGS. 6A-6B illustrate a splice member 400*a* according to an embodiment. Specifically, FIG. 6A is the top view of the splice member 400*a*, and FIG. 6B is the cross-sectional view of the splice member 400*a*, along the cross-section indicated in FIG. 6A.

As shown in FIGS. 6A-6B, the splice member 400*a* may include a base 410*a* and a connector 420*a*. As described below in more detail, the base 410*a* may secure the splice member 400*a* to one or more portions of the stock material unit, and the connector 420*a* may connect together or daisy-chain two stock material units, such that the sheets therefrom may be continuously fed into to the dunnage conversion machine. In the illustrated embodiment, the base 410*a* is larger or has a larger area than the connector 420*a*. For example, providing the base 410*a* with a larger surface area than the connector 420*a* may facilitate removal of the base 410*a* from the connector 420*a*.

Moreover, the base 410*a* may include multiple layers. For example, the base 410*a* may include a base substrate 411*a*, a base adhesive layer 412*a* extending over at least a portion of a first side or face of the base substrate 411*a*, and a release layer 413*a* extending over at least a portion of a second, opposite side or face of the base substrate 411*a*. The connector 420*a* may include a connector substrate 421*a* and a connector adhesive layer 422*a* extending over at least a portion of a first side or face of the connector substrate 421*a* (e.g., second, opposite side of the connector substrate 421*a* may form or define an outer surface of the connector 420*a*).

As shown in FIG. 6B, according to at least one embodiment, when the base 410*a* and the connector 420*a* of the splice member 400*a* are assembled in an initial configuration, the connector adhesive layer 422*a* of the connector 420*a* may be positioned adjacent to and/or in contact with the release layer 413*a* of the base 410*a*. The connector 420*a* may be removed from base 410*a* (or vice versa) in a manner that maintains functional integrity of the connector adhesive layer 422*a*. For example, after removing the connector 420*a* from the base 410*a*, the connector 420*a* may be attached to a portion of the sheet of at least one stock material unit (e.g., at least a portion of the connector adhesive layer 422*a* may be placed into contact with the sheet, thereby securing the splice member 400*a* to the sheet). The connector adhesive layer 422*a* may include pressure-sensitive adhesive (e.g., the connector 420*a* may be pressed against the sheet of a stock material unit in the manner that activates and/or attaches the adhesive layer 422*a* to the sheet).

The base 410*a* may be secured to the sheet of the stock material unit. For example, the base adhesive 412*a* may be placed into contact with the sheet of the stock material unit, thereby securing the base 410*a* to the sheet. In some embodiments, the splice member 400*a* may be included with or attached to the stock material unit. For example, the base 410*a* may be attached to the sheet of the stock material unit, and the connector 420*a* or at least a portion thereof may be removed from the base 410*a* and/or from the sheet of the stock material unit, and may be used to connect the sheet of the stock material unit to the sheet of another stock material unit (e.g., as described below in more detail).

As mentioned above, the base 410*a* may be larger than the connector 420*a*. Moreover, the splice member 400*a* may have an asymmetrical shape. For example, the splice member 400*a* may have a shape that is asymmetric about a longitudinal and/or transverse axis thereof. Alternatively, as shown in FIG. 6A, the splice member 400*a* may have an asymmetrical shape about a first axis and a symmetrical shape about another, perpendicular axis. For example, the splice member 400*a* may be generally symmetrical about axis 10. Moreover, opposing portions of the splice member 400*a* may be asymmetrical about an axis that is perpendicular to the axis 10 (e.g., where the perpendicular axis extends through the center of the splice member 400*a*.

The splice member 400*a* may be at least partially defined by two opposing sides 401*a*, 402*a*. In the embodiment shown in FIGS. 6A-6B, the sides 401*a* and 402*a* are generally linear and parallel to each other. The side 401*a* is than the side 402*a*. Hence, for example, at one side the splice member 400*a* may be wider than at the opposite side. It should be appreciated, however, that the sides 401*a* and 402*a* may have any number of suitable shapes and sizes.

The splice member 400*a* also has nonlinear (e.g., generally curved) sides 403*a*, 404*a* that are generally opposite to each other and extend between the sides 401*a* and 402*a*. Collectively, the sides 401*a*-404*a* define the perimeter of the splice member 400*a*. For example, the sides 401*a*-404*a* may define a generally butterfly-shaped splice member 400*a*.

In the illustrated embodiment, the sides 403*a* and 404*a* curve in the manner that define corresponding depressions or indentations toward the center of the splice member 400*a*. For example, each of the sides 403*a* and 404*a* include an inwardly curving section (curing toward the center of the splice member 400*a*), a first slanted section extending outward from the inwardly curving section toward the side 401*a*, and a second slanted section extending outward from the inwardly curving section toward the side 402*a*. Moreover, first slanted sections that extend from each of the sides 403*a* and 404*a* and toward the side 401*a* may be oriented at acute angles relative thereto. Similarly, the second slanted sections that extend from each of the sides 403*a* and 404*a* and toward the side 402*a* may be oriented at acute angles relative thereto.

Each of the sides 403a and 404a may include a transverse, linear section that extends from the side 401a to the respective first slanted section. For example, the transverse, linear sections may be generally perpendicular to the side 401a and may extend therefrom to the end points of the first slanted sections that define portions of the sides 403a, 404a. In some embodiments, the splice member 400a may include fillets connecting respective second slanted sections of the sides 403a and 404a to the side 402a.

The base 410a and connector 420a may share and/or may be aligned along the side 402a. For examples, the base 410a and connector 420a may terminate at the side 402a. Moreover, as mentioned above, the base 410a may be larger than the connector 420a. For example, the periphery of the base 410a may be defined by the sides 401a-404a (e.g., the periphery of the base 410a may coincide with the periphery of the splice member 400a). In some embodiments, at least a portion of the periphery of the base 410a and a portion of the periphery of the connector 420a may coincide with the corresponding portions of the sides 403a and 404a. Moreover, for example, the periphery of the connector 420a may be defined by the side 402a, portions of the sides 403a, 404a, by a connector side 423a, and linear sections 424a, 425a extending from the connector side 423a and terminating at the sides 403a and 404a respectively.

For example, the connector side 423a may be offset from the side 401a of the splice member 400a, which defines the corresponding side of the base 410a. The connector side 423a may be generally parallel to the side 401a of the splice member 400a. For example, the offset between the connector side 423a and the side 401a may form a portion of the base 410a that is not in contact with the connector 420a and/or that forms the excess area of the base 410a (i.e., the portion by which the base 410a is larger than the connector 420a).

Figure 7A:
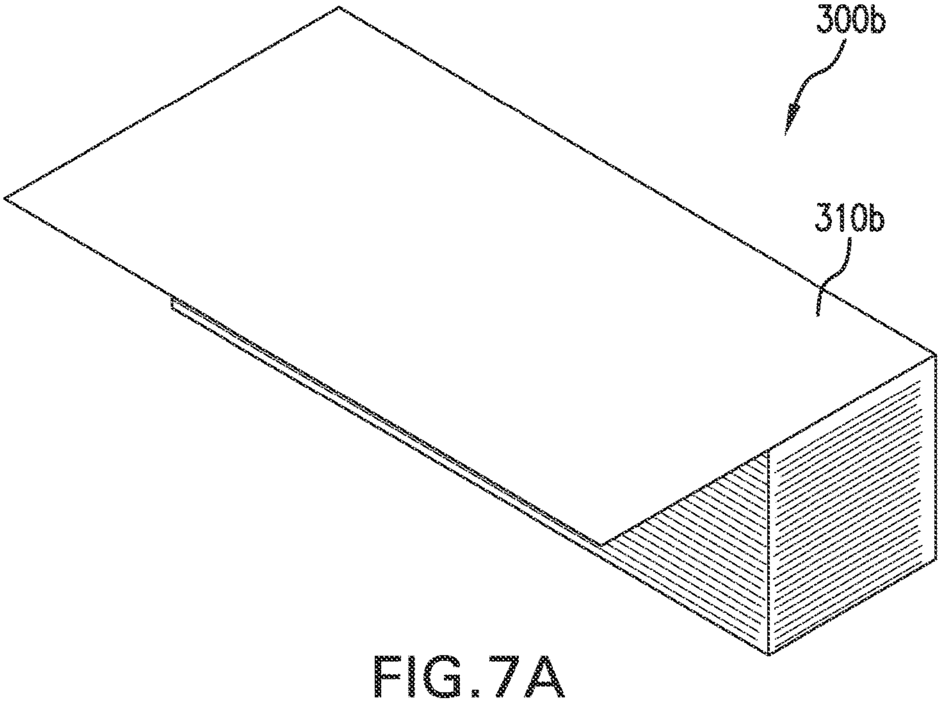
FIGS. 7A-7G is a perspective view of an embodiment of a folded stock material unit for a dunnage conversion machine, illustrating different steps involved in folding a sheet of the stock material unit.
Figure 7B:
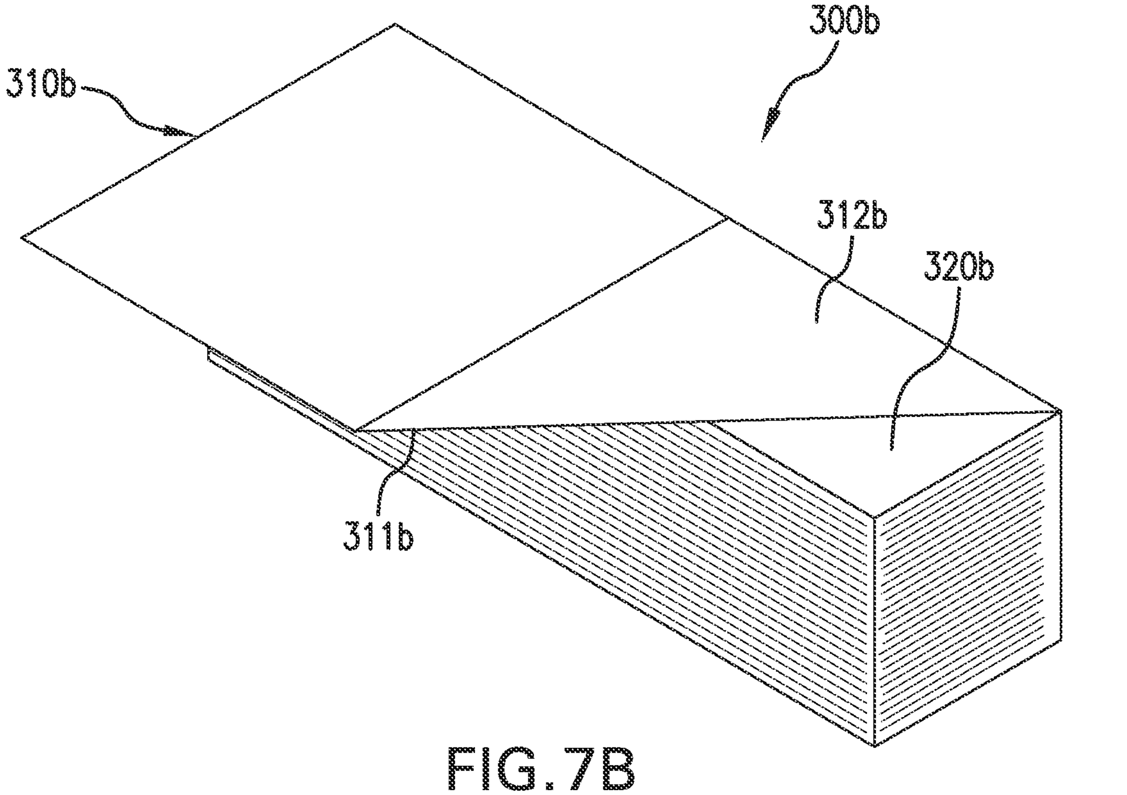

As described above, the stock material unit may include a continuous sheet that may be repeatedly folded to form or define a three-dimensional body or stack of the stock material unit. FIGS. 7A-7G illustrate folding of a partially folded continuous sheet to produce a stock material unit 300b according to an embodiment (showing steps or a method acts for how at least a portion of the continuous sheet material may be folded, according to an embodiment). Except as described herein, the stock material unit 300b may be similar to the stock material unit 300 (FIGS. 3A-3H). For example, a continuous sheet may be repeatedly folded in opposing directions, along transverse fold lines, to form sections or faces along the longitudinal direction of the continuous sheet, such that adjacent section may fold together (e.g., accordion-like) to form the three-dimensional body of the stock material unit 300b. As shown in FIG. 7A, after folding the continuous sheet to form the three-dimensional body or stack of the stock material unit 300b, a portion 310b may remain at the top of the stack. For example, the portion 310b may be larger (e.g., wider) than the width or longitudinal dimension of the three-dimensional body of the stock material unit 300b. As shown in FIG. 7B, part of the portion 310b may be folded along a slanted fold line 311b to form a section 312b. Specifically, for example, the slanted fold line 311b has a non-parallel orientation relative to the transverse and longitudinal directions of the continuous sheet of the stock material unit 300b. Moreover, folding part of the portion 310b to form the section 312b may expose the underlying section 320b of the stock material unit 300b.

Figure 7C:
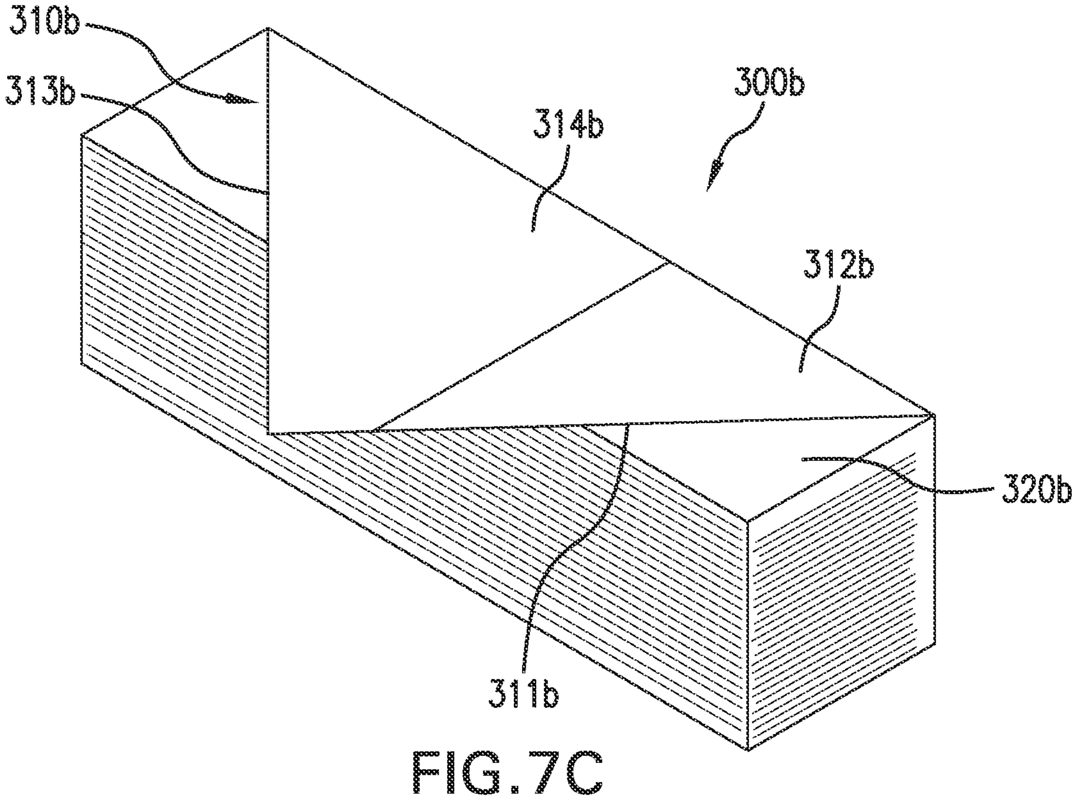
Figure 7D:
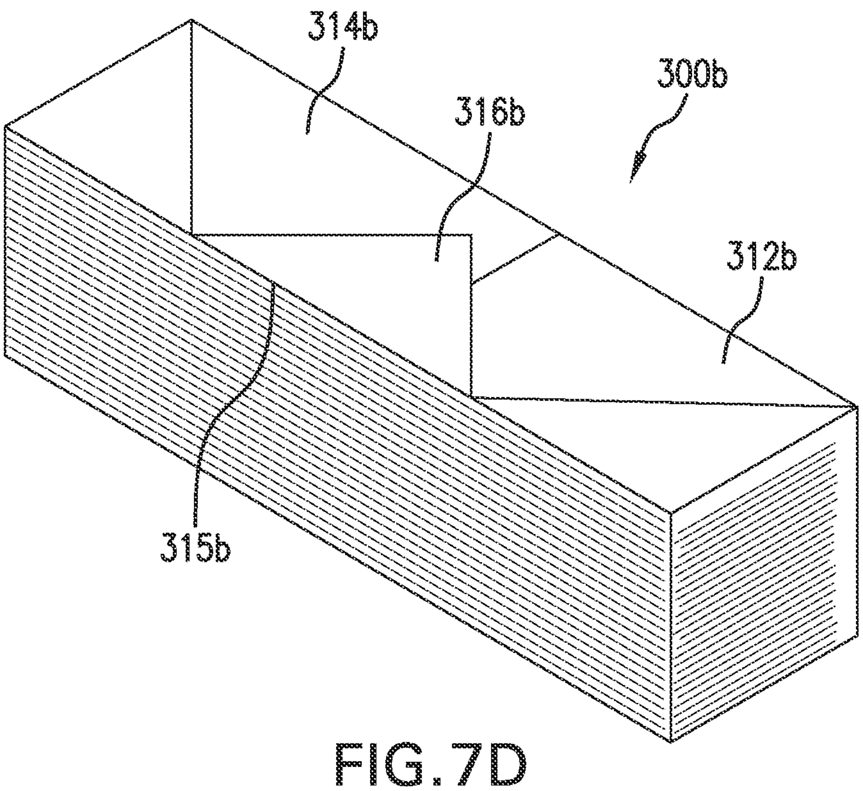

As shown in FIG. 7C, part of the portion 310b may be folded along another slanted fold line 313b to form section 314b. Collectively, sections 312b and 314b form a triangular section or portion of the stock material unit 300b. In some embodiments, the section 312b may be larger than the section 314b. Moreover, the peak of the triangular section formed or defined by sections 312b and 314b may be approximately at the center of the transverse dimension of the stock material unit 300b. For example, folding part of the portion 310b along the fold line 313b may also include folding a portion of the section 312b onto another portion of the section 312b. Hence, for example, as described above, near the tip, the triangular section formed by sections 312b and 314b may include more folds than at the base thereof (e.g., near the tip, where sections 312b and 314b overlap, there may be four layers, and near the base of the triangular section there may be two layers).

Moreover, a portion of the triangular section that is formed by the sections 312b and 314b about a transverse fold line 315b to form a smaller triangular section 316b. For example, the triangular section 316b may be folded over the sections 312b and 314b. Moreover, least a portion of the triangular section 316b may be attached to a portion of a sheet of another stock material unit. Hence, for example, additional layers of the continuous sheet at the portion of the triangular section 316b may reinforce the portion of the triangular section 316b that may attach to a portion of a sheet of another stock material unit.

Moreover, the triangular section 316b may be secured to the sections 312b and 314b (e.g., to facilitate storage and/or transportation of the stock material unit 300b). For example, the splice member 400a may secure the triangular section 316b to the sections 312b and 314b. As described above, the splice member 400a may have side 401a and side 402a that is shorted than the side 401a.

Figure 7E:
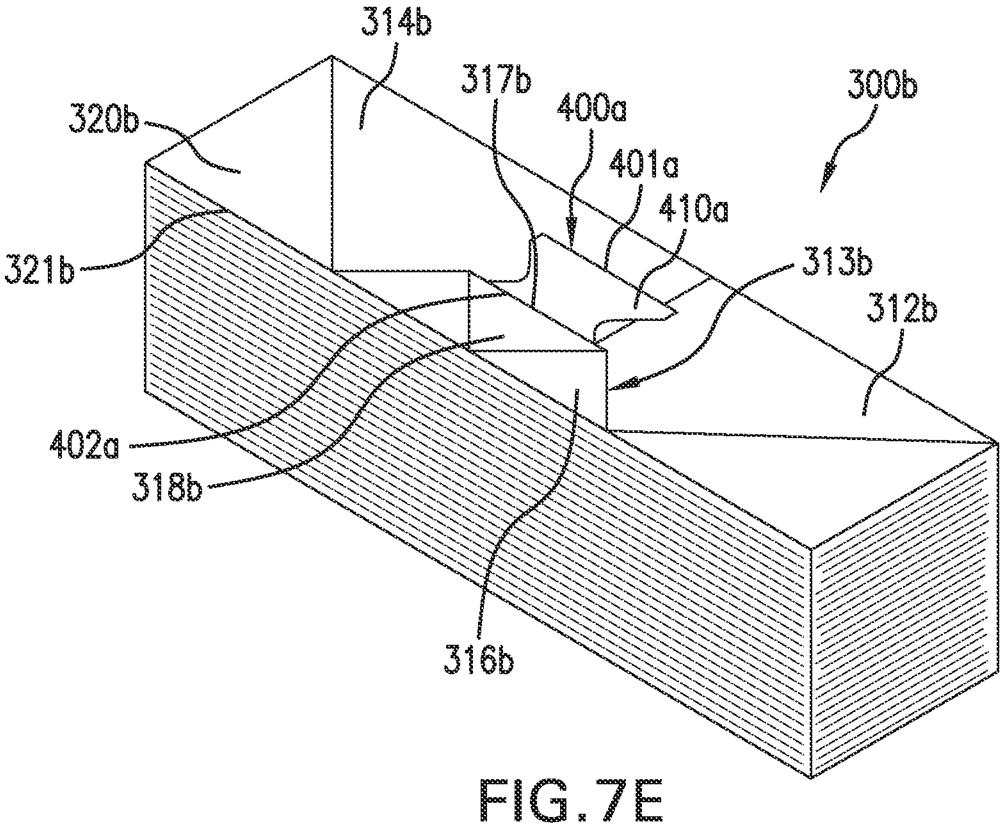
Figure 7F:
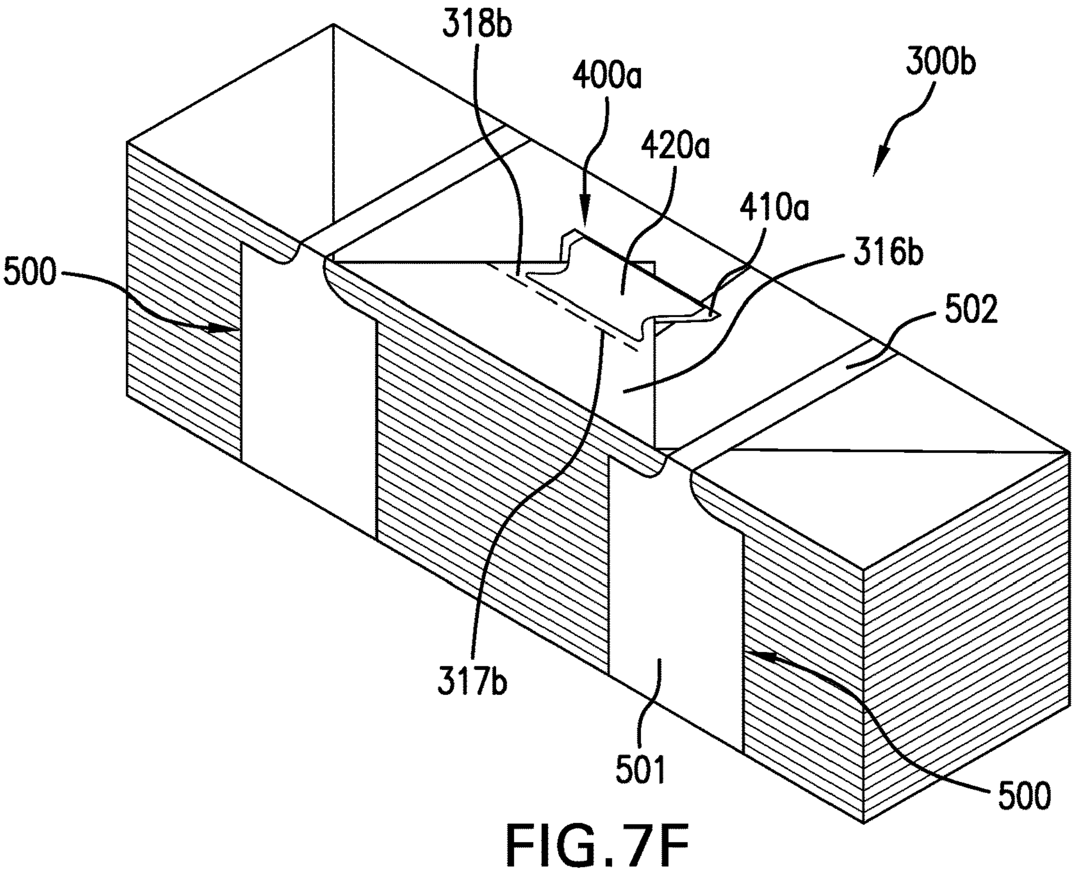

As shown in FIGS. 7E-7F, a portion of the triangular section 316b may be folded over a fold line 317b to form a section 318b. For example, the folding line 317b may be located at a distance from an edge 321b of the section 320b, such that the peak of the section 318b is located near or approximately at the edge 321b after folding.

Moreover, as shown in FIG. 7E, the base 410a of the splice member 400a may be attached to the sections 312b and 314b. For example, as described above, the base 410a may include an adhesive layer that may be adhered to the sections 312b and 314b. The connector of the splice member 400a may be detached from the base 410a (e.g., the base 410a may be positioned such that the release layer thereof faces outward or away from the sections 312b and 314b).

The side 402a of the splice member 400a may be positioned near or adjacent to the fold line 317b of the stock material unit 300b. Additionally or alternatively, a center of the side 402a may coincide with a center line of the transverse dimension of the stock material unit 300b. For example, as shown in FIG. 7F, section 318b may be folded over the base 410a (e.g., back over the crease or fold line 317b). In the illustrated embodiment, a portion of the section 318b may extend past the base 410a. For example, the tip or peak of the section 318b may extend past the 310a. It should be appreciated, however, that the section 318b may have any suitable position relative to the base 410a. For example, a user or operator may grasp the tip of the section 318b to lift the section 318b and the connector 420a away from the base 410a of the splice member 400a.

The connector 420a of the splice member 400a may be attached to the section 318b of the stock material unit 300b (e.g., the adhesive layer of the connector 420a may be attached to the section 318b). For example, connector 420a may be spaced away from the fold line 317b.

In the illustrated embodiment, the connector 420*a* attaches the section 318 to the base 410*a*. Specifically, a portion of the connector 420*a* is attached to the section 318*b* (e.g., non-removably attached) and a portion of the connector 420*a* is attached to the base 410*a*. As mentioned above, the connector 420*a* may be removable attached to the base 410*a*. Hence, attaching the section 318*a* to the base 410*a* with the connector 420*a* may allow detachment of the connector 420*a* together with the section 318*a* from the base 410*a* (e.g., without damaging or deactivating the adhesive of the adhesive layer of the connector 420*a*). For example, the connector 420*a* may be positioned and oriented relative to the base 410*a* in a manner that the adhesive portions of the connector 420*a* are located within the base 410*a* and do not contact any portion of the continuous sheet of the stock material unit 300*b*. Hence, generally, the base 410*a* may be suitably sized to facilitate attachment of the connector 420*a*. For example, after attachment to the base 410*a*, edges of the connector 420*a* may be suitably spaced from the edges of the base 410*a* (e.g., to allow for ease of placing or attaching the connector 420*a* to the base 410*a* without unintentionally adhering the connector 420*a* to one or more portions of the base sheet).

The stock material unit 300*b* may include one or more straps that may secure the folded continuous sheet (e.g., to prevent unfolding or expansion and/or to maintain the three-dimensional shape thereof). For example, strap assemblies 500 may wrap around the three-dimensional body of the stock material unit 300*b*, thereby securing together the multiple layers or sections (e.g., formed by accordion-like folds). The strap assemblies 500 may facilitate storage and/or transfer of the stock material unit 300*b* (e.g., by maintaining the continuous sheet in the folded and/or compressed configuration).

For example, when the stock material unit 300*b* is stored and/or transported, wrapping the three-dimensional body of the stock material unit 300*b* and/or compressing together the layers or sections of the continuous sheet that defines the three-dimensional body may reduce the size thereof. Moreover, compressing together the sections of the continuous sheet may increase rigidity and/or stiffness of the three-dimensional body and/or may reduce or eliminate damaging the continuous sheet during storage and/or transportation of the stock material unit 300*b*.

Moreover, the strap assemblies 500 may facilitate the handling of the stock material unit 300*b*. For example, the strap assemblies 500 may include a wider portion 502 and a narrower portion 503. The narrower portion 503 may be suitably sized and/or shaped to facilitate gripping thereof by a user or operator. The wider portion 502 may facilitate securing and/or supporting the weight of the stock material unit 300*b*. For example, the weight of the stock material unit 300*b* may be distributed over one or more wider sections of the corresponding strap assemblies 500, which may reduce or avoid damaging and/or ripping the continuous sheet of the stock material unit 300*b*.

Figure 7G:
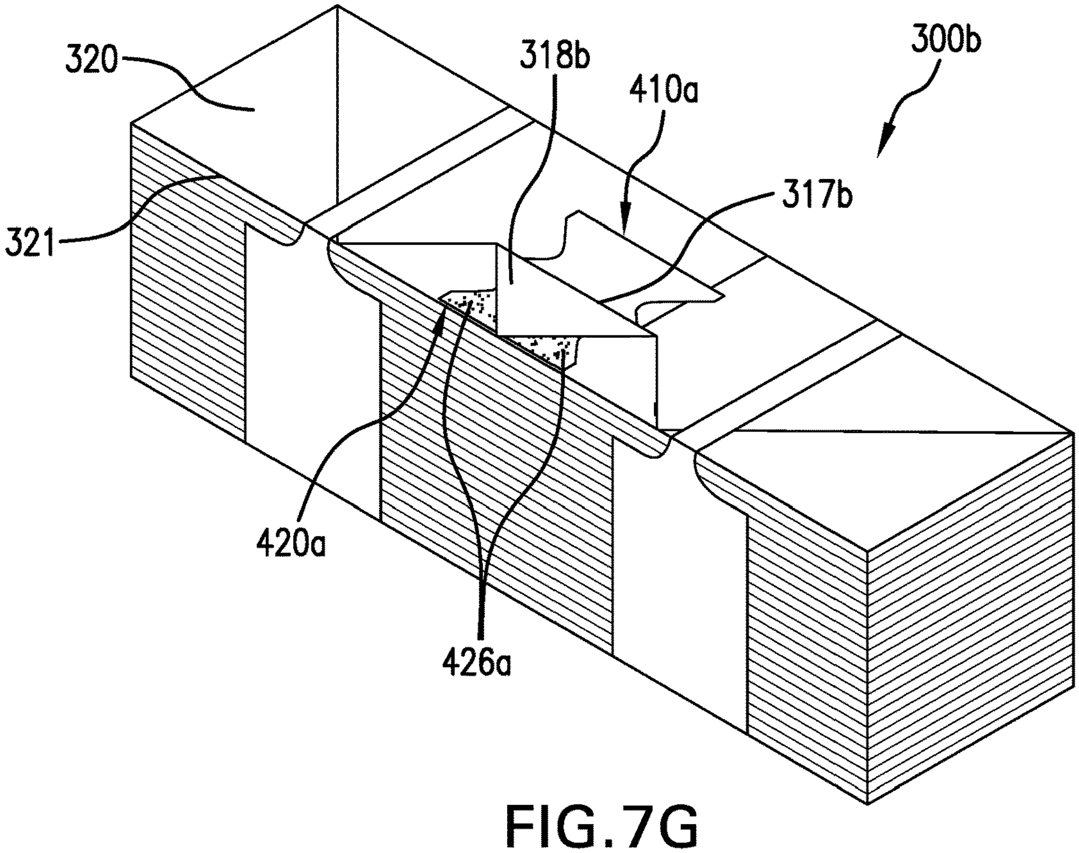

Generally, the strap assemblies 500 may be positioned at any number of suitable locations along the transverse dimension of the stock material unit 300*b*. In the illustrated embodiment, the strap assemblies 500 are positioned on opposite sides of the section 318*b* (i.e., the section 318*b* is positioned between two strap assemblies 500). For example, as shown in FIG. 7G, connector 420*a* together with the section 318*b* may be detached from the base 410*a*. Furthermore, the section 318*b* may be folded over the fold line 317*b* (e.g., such that the tip of the section 318*b* is positioned near the edge 321*b* of the section 320*b*). After folding the section 318*b*, one or more portions of the connector adhesive layer 422*a* of the connector 420*a* may be exposed and/or may face outward relative to the three-dimensional body of the stock material unit 300*b* (e.g., one or more portions of the connector adhesive layer 422*a* of the connector 420*a* may define one or more portions of at least one outer face of the stock material unit 300*b*).

In the illustrated embodiment, when the stock material unit 300*b* may be connected to another stock material unit (e.g., when the adhesive layer of the connector is exposed), the connecter may be connected to a downward-facing portion of the stock material unit. For example, as described above, connector 420*a* may be attached to the section 318*b* and may be exposed for connection when the non-adhesive side or portion of the connector 420*a* faces downward.

As shown in FIG. 7G, the strap assemblies 500 may be positioned relative to the section 318*b* in a manner that allows folding of the section 318*b*, as described above. For example, when the stock material unit 300*b* is added to the supply station of the dunnage conversion machine, the section 318*b* may be folded in the manner described above, before removing the strap assemblies 500 from the stock material unit 300*b*. It should be appreciated, however, that the stock material unit 300*b* may include any number of strap assemblies 500 that may be located or positioned at any number of suitable locations, in the manner that secures together the folds or sections of the continuous sheet of the stock material unit 300*b*. Moreover, the stock material unit 300*b* may include no straps.

Figure 8:
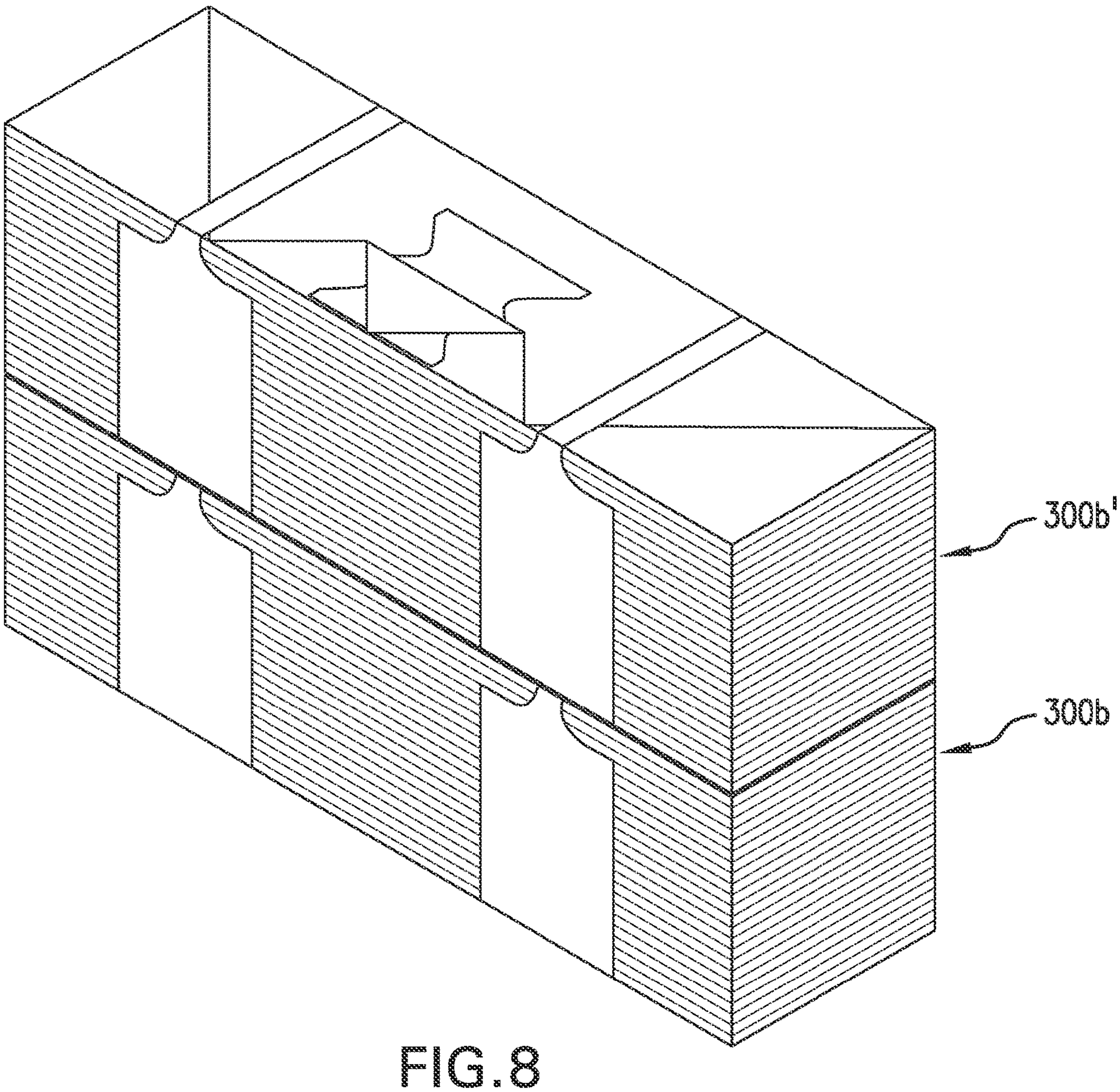
FIG. 8 is a perspective view of an embodiment of two stock material units daisy-chained together.

In some embodiments, another stock material unit may be placed on top of the stock material unit 300*b*, such that the bottom section and/or portion of the continuous sheet thereof contacts the exposed portion(s) of the connector adhesive layer, thereby securing the continuous sheet of the stock material unit 300*b* to the continuous sheet of another stock material unit. FIG. 8 illustrates stacking and connecting together multiple stock material units.

In the illustrated embodiment, portions 426*a* of the connector 420*a* protrude past the section 318*b*. For example, the portions 426*a* of the connector 420*a* may protrude outward on opposing sides of the section 318*b*. Moreover, in some embodiments, the protruding portions 426*a* may have generally triangular shapes.

As shown in FIG. 8, stock material unit 300*b*' may be stacked on top of stock material unit 300*b*. Generally, stock material unit 300*b*' may be similar to or the same as the stock material unit 300*b* (FIGS. 7A-7G). Moreover, as described above, the connector of the splice member that is included with the stock material unit 300*b* may be attached to the stock material unit 300*b*' (e.g., as described above). For example, the connector adhesive layer of the connector that is attached to the stock material unit 300*b* may face outward or upward (e.g., as described above in connection with FIG. 7G).

Under some operating conditions, the stock material unit 300*b*' may be placed on top of the stock material unit 300*b* after folding a portion of the continuous sheet of the stock material unit 300*b* in the manner that exposes the connector adhesive layer of the connector that is attached to the stock material unit 300*b*. Hence, for example, placing the stock material unit 300*b*' on top of the stock material unit 300*b* may contact the adhesive of the connector on the stock material unit 300*b* with a portion of the continuous sheet of the stock material unit 300*b*', and thereby connect together the continuous sheets of the stock material unit 300*b* and stock material unit 300*b*' (e.g., to facilitate continuous feed into the dunnage conversion machine). For example, the adhesive of the connector may be pressure sensitive-adhesive, and the pressure applied onto the connector by the portion of the continuous sheet of the stock material unit 300*b*' (e.g., by the weight of the stock material unit 300*b*').

Moreover, as mentioned above, the stock material unit 300*b*' may be the same as the stock material unit 300*b*. For example, the stock material unit 300*b*' may include a connector that may be oriented to have the adhesive thereof face upward or outward. Hence, an additional stock material unit may be placed on top of the stock material unit 300*b*', such as to connect together the continuous sheet of the stock material unit 300*b*' with the continuous sheet of another stock material unit. In such manner, any suitable number of stock material units may be connected together and/or daisy-chained to provide a continuous feed of stock material into the dunnage conversion machine.

Figure 9:
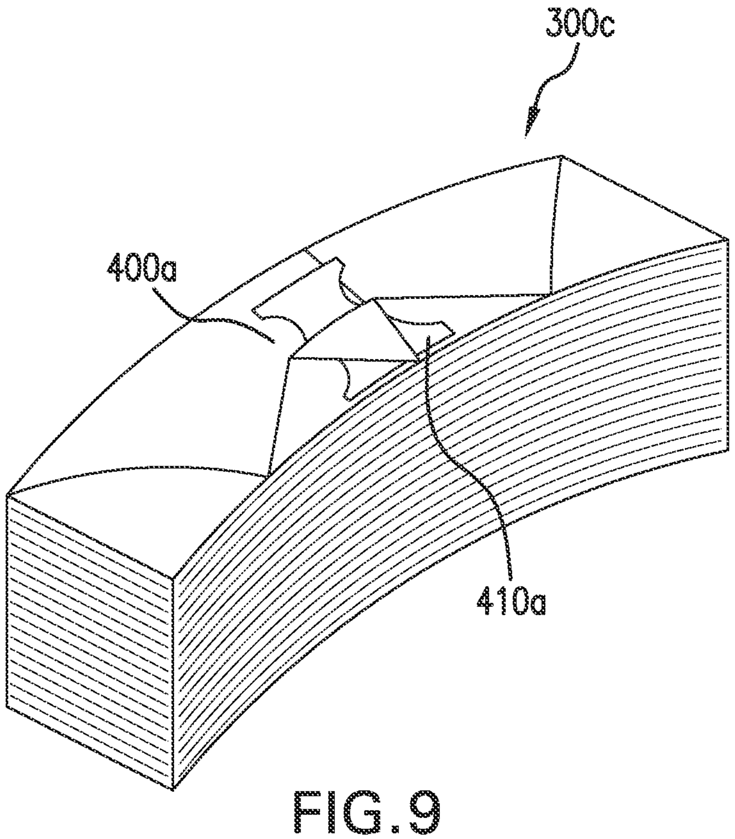
FIG. 9 is a perspective view of an embodiment of a stock material unit for a dunnage conversion machine.

In some embodiments, the stock material unit may be bent. FIG. 9 illustrates a stock material unit 300*c* according to an embodiment. Specifically, for example, the stock material unit 300*c* may be bent. In the illustrated embodiment, the stock material unit 300*c* includes a splice member 400*a* (e.g., except as otherwise described herein, the stock material unit 300*c* may be similar to the stock material unit 300 and/or stock material unit 300*b* (FIGS. 3A-3H, 7A-7G). The stock material unit 300*c* may be bent in the manner that protrudes the connector 420*a* of the splice member 400*a* outward relative to other portions of the stock material unit 300*c*.

In some examples, the stock material unit 300*c* may be bent after placement into the supply station (e.g., the supply station may include a hump or a similar feature that may push a center of the stock material unit 300*c* outward or upward). Stacking or placing another, additional stock material unit on top of the bent stock material unit 300*c* may facilitate contacting the adhesive layer of the connector 420*a* with the continuous sheet of the additional stock material unit.

Figure 10:
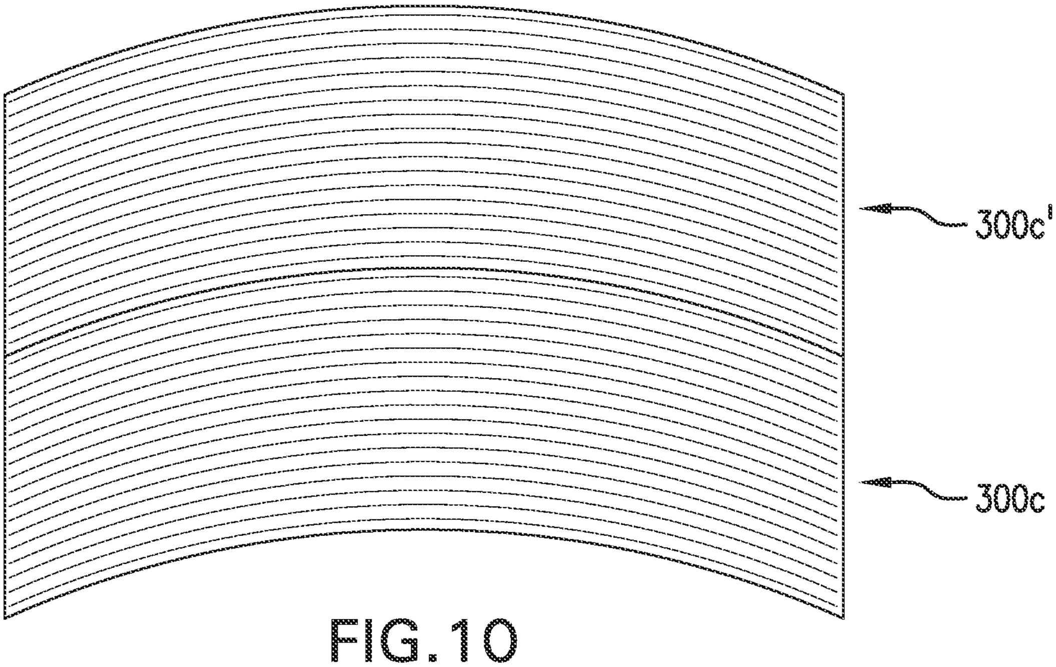
FIG. 10 is a front view of an embodiment of two stock material units daisy-chained together.

For example, the additional stock material unit may have a generally planar configuration or a generally planar bottom face (e.g., similar to or the same as the stock material unit 300*b* (FIGS. 7A-7G)). Hence, the planar face of the additional stock material unit may first contact the adhesive layer of the connector. For example, the weight of the additional stock material unit may be initially applied on and/or near the portion that contacts the adhesive layer of the connector, thereby applying more pressure onto the adhesive layer. After the additional stock material is placed on top of the stock material unit 300*c*, the additional stock material unit may conform to the shape of the stock material unit 300*c*. For example, as shown in FIG. 10, stock material unit stock material unit 300*c*' that is placed on top of the stock material unit 300*c* conforms to the bent shape of the stock material unit 300*c*.

Referring back to FIG. 9, the stock material unit 300*c* may include a support 600 that may shape or bend the three-dimensional body defined by the folded continuous sheet of the stock material unit 300*c*. For example, the support 600 may be plastic or cardboard. Moreover, the support 600 may be a rib, a plate, etc., and may be secured to the three-dimensional body of the stock material unit 300*c* (e.g., with one or more straps, such as strap assemblies 500 (FIG. 7F)). The stock material unit 300*c* may be placed into the supply station together with the support. For example, the bottom of the supply station may be generally flat or planar, and the support that is attached to the three-dimensional body of the stock material unit 300*c* may shape the stock material unit 300*c* in the manner that protrudes the connector 420*a* outward relative to other portions of the top face of the stock material unit 300*c*.

While the splice assemblies described herein may be used with stock material units that have a folded continuous sheet (e.g., fanfold material), it should be appreciated that the splice assemblies may be use with and/or included in stock material units that include one or more sheets of any number of suitable configurations or combinations. For example, as described above, stock material units may include a continuous sheet that is configured into a roll, may include multiple sheets that are stacked together and/or positioned near one another, etc.

Figure 11A:
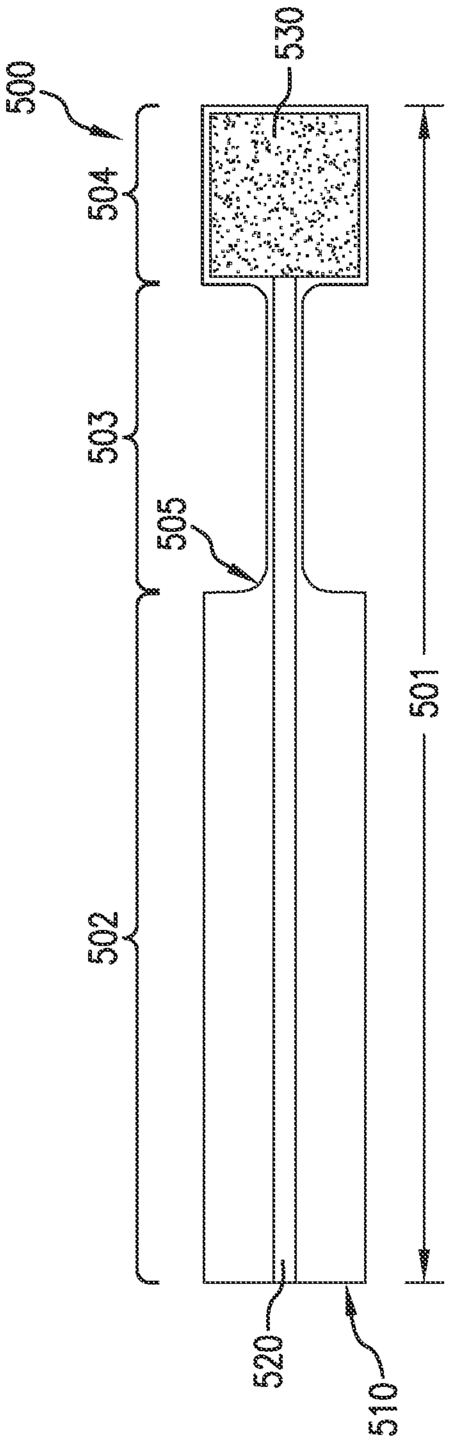
FIG. 11A is a top view of an embodiment of a strap assembly in an unwrapped configuration.
Figure 11B:
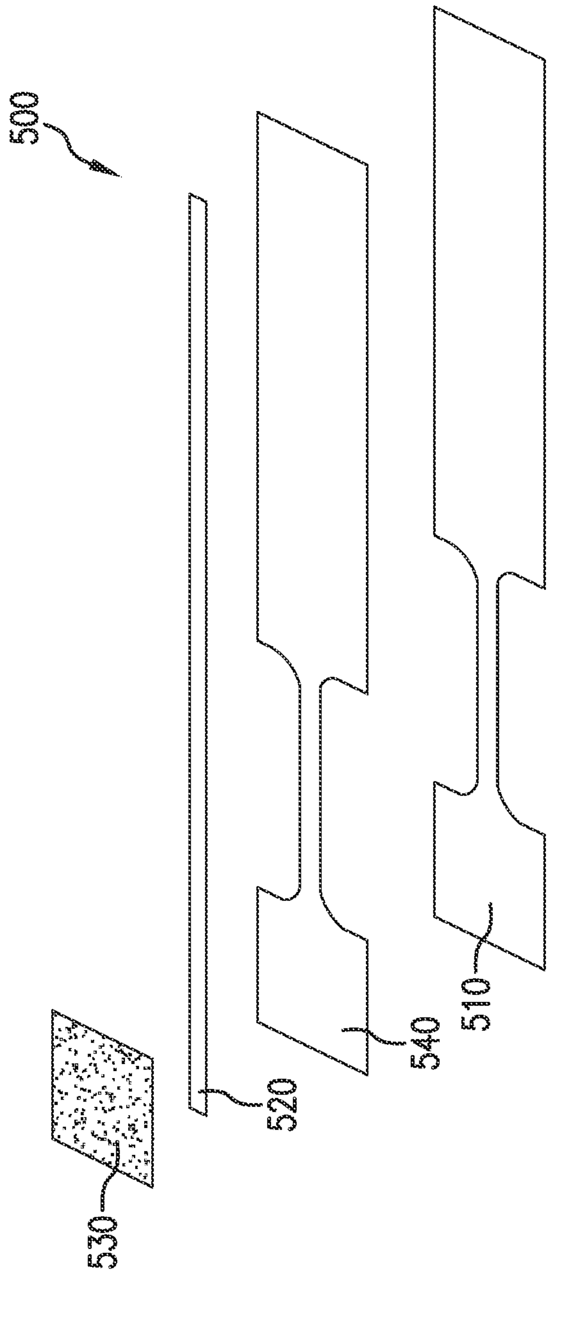
FIG. 11B is an exploded, perspective view of an embodiment of the strap assembly of FIG. 11A.

As described above, the stack of fanfold material may be wrapped or bundled by one or more straps that may compress and/or secure together sections of the fanfold material (e.g., to securely form a three-dimensional body). FIGS. 11A-11B illustrate the strap assembly 500 in an unwrapped configuration according to an embodiment. Specifically, FIG. 11A is the top view of the strap assembly 500, and FIG. 11B is a perspective, exploded view of the strap assembly 500.

In some embodiments, the strap assembly 500 includes a base sheet 510, a reinforcement member 520, and an adhesive 530. As described below in more detail, the adhesive 530 may secure opposing ends of the strap assembly 500 to reconfigure the strap assembly 500 from the unwrapped into wrapped configuration. Furthermore, in at least one embodiment, the strap assembly 500 includes a laminate layer 540.

Generally the strap assembly 500 is relatively thin or sheet-like. For example, overall thickness of the strap assembly 500 may be from 0.001 inch to 0.050 inch. It should be appreciated, however, that the strap assembly 500 may be thinner than 0.001 inch or thicker than 0.050 inch.

Moreover, in the illustrated embodiment the strap assembly 500 has an elongated shape. For example, longitudinal dimension 501 of the strap assembly 500 may be greater than a transverse direction thereof (e.g., measured along a direction that is perpendicular to the longitudinal dimension). The longitudinal dimension 501 is suitable to facilitate wrapping the strap assembly 500 about a fanfold stack (e.g., as described above) or about any other material stack or roll and to secured the portion of the strap assembly 500 that includes the adhesive 530 to an opposing portion of the strap assembly 500.

The adhesive 530 is generally located at or near a first end of the strap assembly 500. The strap assembly 500 may be wrapped or looped, such that the first end of the strap assembly 500, which has the adhesive 530, is positioned over at least a portion of the second end of the strap assembly 500. Moreover, the adhesive 530 may secure together the first and second ends of the strap assembly 500, to suitably secure the material about which the strap assembly 500 is wrapped. For example, wrapping the strap assembly 500 may include adjusting the strap assembly 500 to a suitable size and/or to have a suitable tension against the three-dimensional body wrapped thereby (e.g., to suitably compress the three-dimensional body).

The transverse dimension of the strap assembly 500 may vary along the longitudinal direction of the strap assembly 500. For example, as shown in FIGS. 11A-11B, the strap assembly 500 has a first portion 502 that extends longitudinally from and defines the first end of the strap assembly 500; a second portion 503 that extends longitudinally from the first portion 502, and a third portion 504 that extends from the section portion 503 and defines the end of the strap assembly 500. Hence, for example, the second portion 502 is located between the first and third portions 502, 504.

In the illustrated embodiment, the second portion 503 is narrower than the first and third portions 502, 504 (e.g., the transverse dimension of the second portion 503 is smaller than transverse dimensions of the first and third portions 502, 504). For example, as a ratio of the width or transverse dimension of the first and/or third portions 502, 504, the width or transverse dimension of the second portion 503 may be in one or more of the following ranges (described as the ratio of the width of the second portion 503 to first/third portion 502/504): from 1:1.1 to 1:4, from 1:3 to 1:6, from 1:5 to 1:10. It should be appreciated that in other embodiments the ratio of the width or transverse direction of the second portion 503 to the width or transverse dimension of the first and/or third portions 502, 504 may be greater than 1:1.1 or less than 1:10 (i.e., the width of the second section may be wider than 91% of the width of the first or third portion 502, 504 or narrower than 10% of the width of the first or third portion 502, 504). For example, the width of the second portion 503 may be at least 50% smaller than the width of the first and/or third portions 502, 504. As shown in the drawings, in this embodiment, the length of the reinforcement member 520 is substantially the same as the base sheet 510. In this embodiment, the width, or transverse dimension, of the reinforcement member 520 is less than the width, or transverse dimensions, of the first and third portions 502, 504. The width, or transverse dimension, of the reinforcement member 520 is close to or slightly less than the width, or transverse dimension, of the second portion 503. Therefore the ratio of the width, or transverse dimension, of the reinforcement member 520 to the width, or transverse dimensions, of the first/third portions 502, 504 can be less than one or more of the above ratios or percentages.

In the illustrated embodiment, the second section 503 is sized to facilitate gripping or grasping by an operator. For example, as described below in more detail, when the strap assembly 500 is reconfigured into a wrapped configuration, the second section 503 may be suitably exposed or available to the operator, such that the operator may grasp the strap assembly 500 at the second section 503 (e.g., the second section may form or define a handle, when the strap assembly 500 is in the wrapped configuration).

The periphery or perimeter of the strap assembly 500 may be defined by the edges that define the first, second, and third portions 502, 503, and 504. In some embodiments, the strap assembly 500 includes fillets 505 that may define at least a portion of the transition between the first section 502 and the second section 503 and/or between the third section 504 and the second section 503. Hence, for example, the periphery of the strap assembly 500 may be also defined by the fillets 505.

Generally, the base sheet 510, reinforcement member 520, and laminate layer 540 of the strap assembly 500 may include any number of suitable materials. For example, the base sheet 510 may include a suitable sheet material, such as paper, plastic sheet, cardboard, etc. (e.g., the base sheet 510 may include Kraft paper). The reinforcement member 520 may include any number of suitable materials that may suitably reinforce the base sheet 510 to facilitate handling of the material secured or wrapped by the strap assembly 500 (e.g., by grasping the second section 503 when the strap assembly 500 is in the wrapped configuration). For example, the reinforcement member 520 may include a fiber reinforced tape or sheet (e.g., intertape polymer group fiber) that may be secured to the base sheet 510.

The reinforcement member 520 may be directly secured to the base sheet 510 (e.g., by adhering or bonding or mechanically securing the reinforcement member 520 directly to the base sheet 510). Alternatively, the reinforcement member 520 may be indirectly secured to the base sheet 510. For example, one or more intervening members may be secured between the reinforcement member 520 and the base sheet 510. Furthermore, the reinforcement member 520 may be substantially continuously and secured to the base sheet 510. For example, the suitable portion of the surface area of the reinforcement member 520 may be secured to the base sheet 510. Moreover, a suitable length of the reinforcement member 520 may be secured to the base sheet 510. In the illustrated embodiment, the laminate layer 540 is located between the base sheet 510 and the reinforcement member 520.

The laminate layer 540 may include any number of suitable materials that may be attached to the base sheet 510 (e.g., bonded or mechanically secured). For example, the laminate layer 540 may include a plastic sheet, such as a polyethylene laminate, and may have any suitable thickness (e.g., 1 mil, 1.7 mil, 2 mil). In some embodiments, the laminate layer 540 may be coated onto the base sheet 510 (e.g., sprayed, rolled).

The adhesive 530 may be any suitable adhesive (e.g., pressure sensitive adhesive). In some embodiments, adhesive 530 may be the coated onto the laminate layer 540 or base sheet 510. Alternatively, the laminate layer 540 may be included on a sheet that may be attached to the laminate layer 540 or base sheet 510. For example, the adhesive 530 may be included on a double-sided adhesive tape (e.g., 3M X-series general purpose double coated tape). In any event, for example, the adhesive 530 may secure the third portion 504 (a second end) to the first portion 502 (a first end), thereby reconfiguring the strap assembly 500 from the unwrapped configuration into the wrapped configuration.

Figure 12:
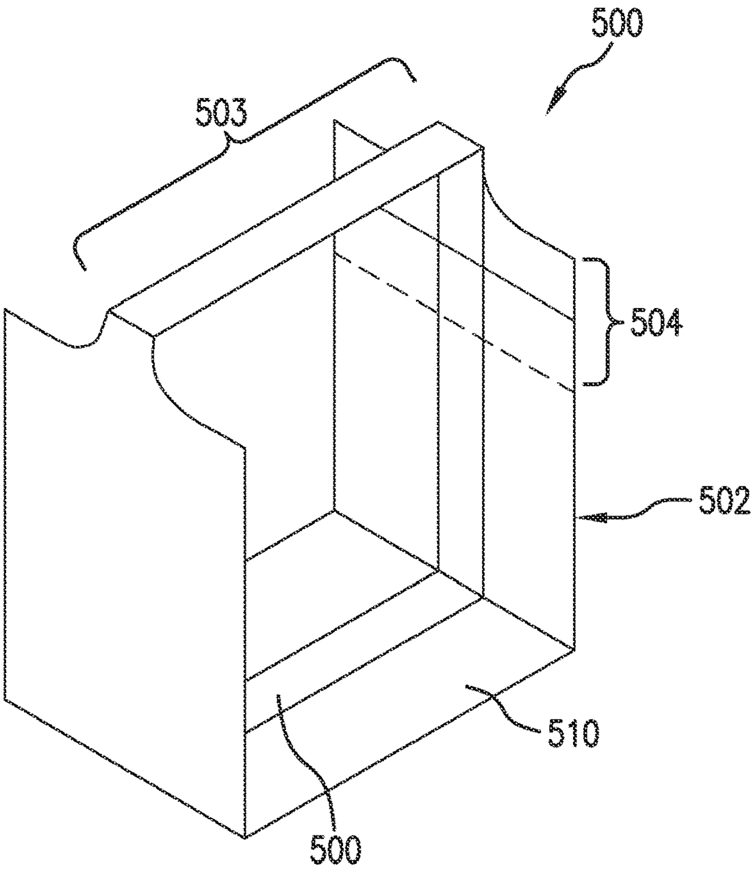
FIG. 12 is a perspective view of an embodiment of the strap assembly of FIG. 11A in a wrapped configuration.

FIG. 12 illustrates an example of the strap assembly 500 in the wrapped configuration according to an embodiment. For example, as shown in FIG. 12, the third portion 504 of the strap assembly 500 is secured to the first portion 502 of the strap assembly 500 (e.g., opposing ends of the strap assembly 500 are secured together). Moreover, the second portion 503 is positioned at the top, such as to form a handle for the stack material unit wrapped by the strap assembly 500. In the illustrated embodiment, the base sheet 510 may have a first face oriented to face outward (e.g., such that the reinforcement member 520 is concealed by the base sheet 510, when the strap assembly 500 is wrapped about the three-dimensional body of the sock material unit). For example, the reinforcement member 520 may be concealed between the three-dimensional body and the base sheet 510. Alternatively, the strap assembly 500 may be wrapped in the manner that the reinforcement member 520 faces outward or defines at least a portion of an outward facing side or face of the strap assembly 500.

Figure 13A:
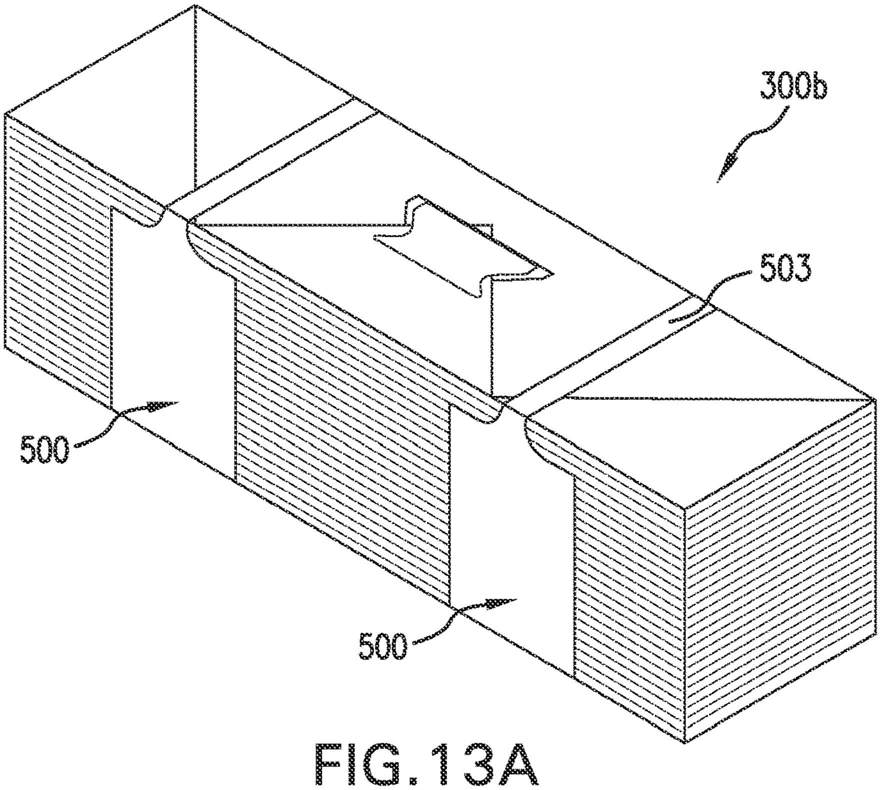
FIG. 13A is a perspective view of an embodiment of a stock material unit that includes strap assemblies of FIG. 11A.

The strap assembly 500 may be wrapped about a material stack that defines a three-dimensional body with a generally rectangular cross-section (e.g., the strap assembly 500 may at least partially conform to the outer shape of the material stack). For example, as shown in FIG. 13A, a stock material unit 300*b* may include a fanfold material stack that defines the three-dimensional body thereof and two strap assemblies 500 that secured together multiple sections of the fanfold. It should be appreciated, however, that the strap may conform to any number of suitable shapes (e.g., round, polygonal, irregular). Furthermore, as shown in FIG. 13A, the strap assemblies 500 may wrap about the three-dimensional body such that one, some, or each of the strap assemblies 500 contact four peripheral surfaces of the three-dimensional body (e.g., the strap assemblies 500 may secure the sheet material that defines the three-dimensional body without additional devices or elements).

In some embodiments, after the strap assemblies 500 are wrapped about the three-dimensional body of the stock material unit, the second portion 503 of each of the strap assemblies 500 (which is narrower than the remaining portions of the strap assemblies 500) may be accessible to a user or operator for grasping. For example, as shown in FIG. 13A, the second portion 503 of each of the strap assemblies 500 may span across a peripheral face of the three-dimensional body of the stock material assembly 300*b* (e.g., the second portion 503 may span across the top face of the three-dimensional body, in the longitudinal direction). Hence, for example, the second portion 503 of each of the strap assemblies 500 may form or define corresponding handles that may be grasped by a user or operator for lifting and/or carrying the stock material unit 300*b*.

The strap assemblies 500 may be spaced from each other along a traverse direction of the three-dimensional body of the stock material unit 300*b*. For example, the strap assemblies may be spaced from each other such that the center of gravity of the three-dimensional body is located between two strap assemblies 500. Optionally, the strap assemblies 500 may be equidistantly spaced from the center of gravity.

As described above, the stock material unit 300*b* may be placed into a dunnage conversion machine. Additionally or alternatively, multiple stock material units (e g, similar to or the same as the stock material unit 300*b*) may be stacked on top of another in the dunnage conversion machine. The stock material unit may include one or more strap assemblies 500. For example, the strap assemblies 500 may remain wrapped about the three-dimensional bodies of the stock material units after placement and may be removed thereafter (e.g., the strap assemblies 500 may be cut at one or more suitable locations and pulled out).

Figure 14:
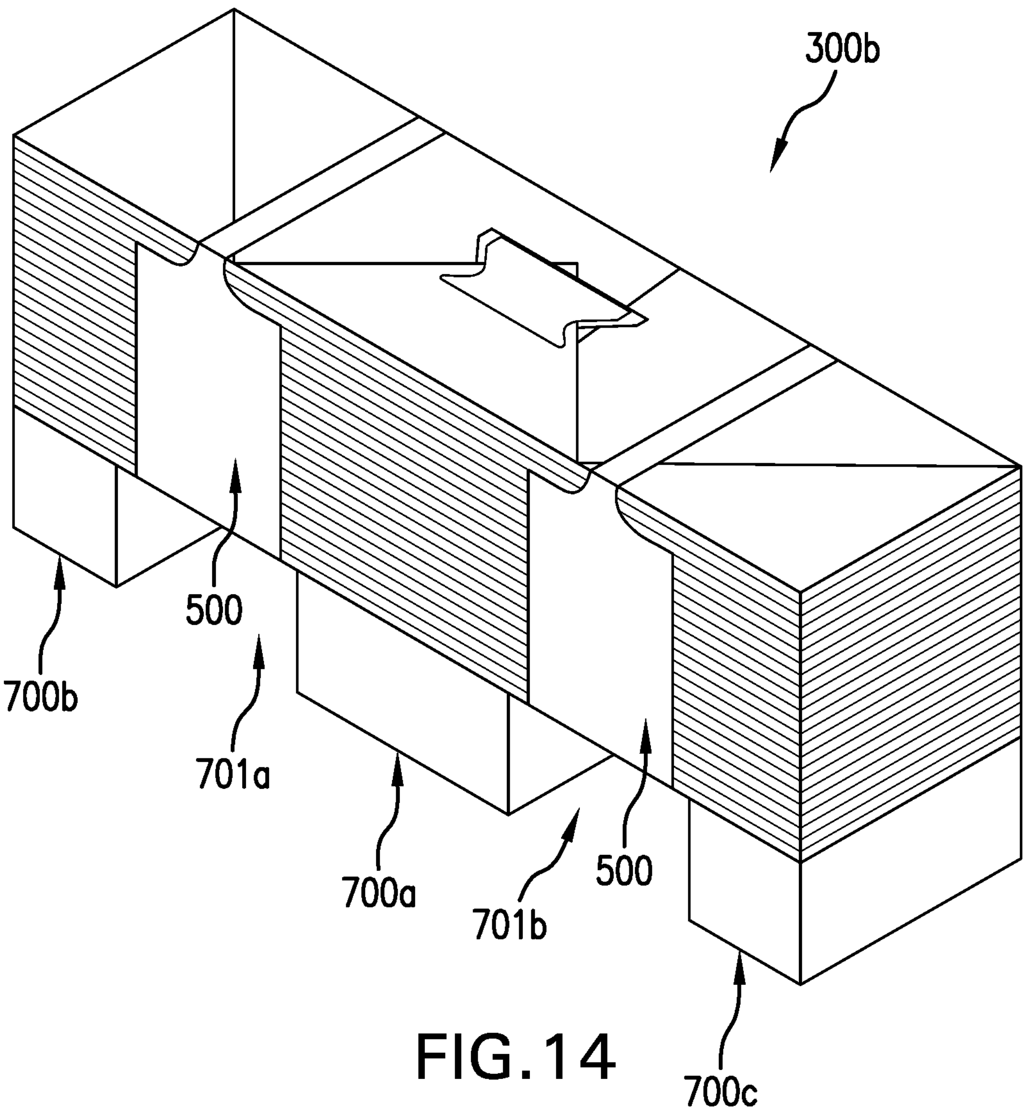
FIG. 14 is a perspective view of an embodiment of supporting a three-dimensional body of a stock material unit.

Wrapping the three-dimensional body of the stock material unit 300*b* may involve positioning the three-dimensional body on one or more supports. As shown in FIG. 14, the three-dimensional body of the stock material unit 300*b* may be placed on supports 700*a*, 700*b*, 700*c*, according to an embodiment. For example, the supports 700*a*, 700*b*, 700*c* may be positioned such as to support the three-dimensional body, so that the strap assemblies 500 may be wrapped about the three-dimensional body (e.g., without interfering with the supports 700*a*, 700*b*, 700*c*). Moreover, the supports 700*a*, 700*b*, 700*c* and the three-dimensional body of the stock material unit 300*b* may align relative to each other, such as to facilitate aligning or locating strap assemblies 500 at suitable location (e.g., as described above) relative to the three-dimensional body.

Figure 13B:
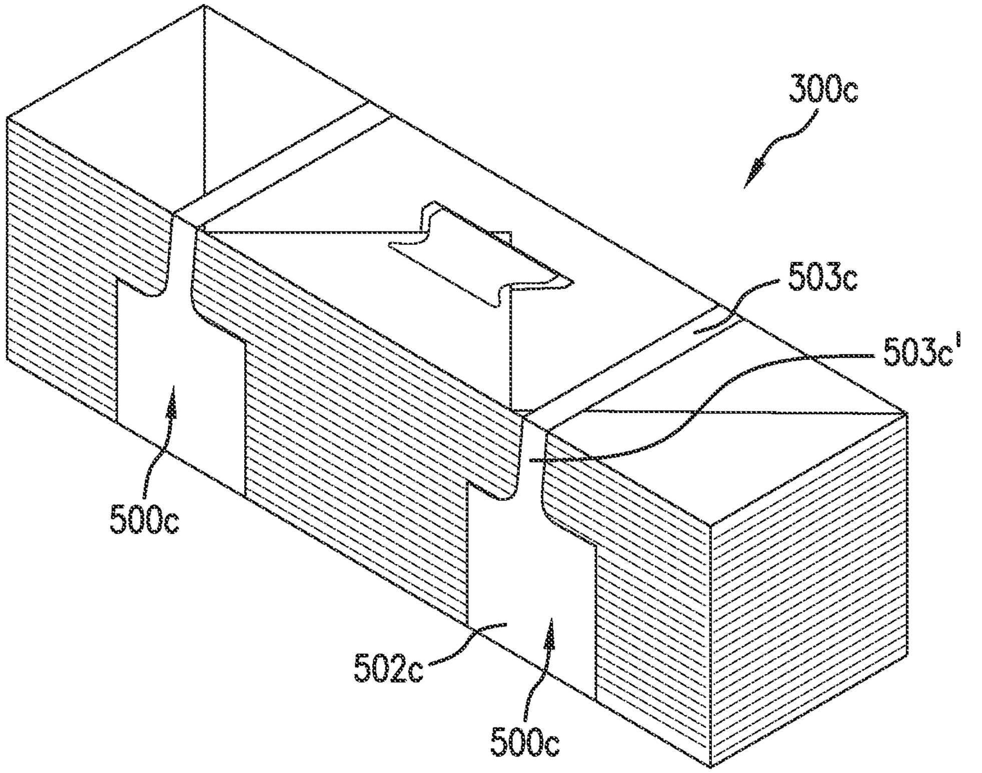
FIG. 13B is a perspective view of an embodiment of a stock material unit that includes strap assemblies.

The narrower portion of the strap assembly may have any suitable length and/or may wrap about any portion of the stock material. As shown in FIG. 13B, for example, strap assemblies 500*c* may secure the stock material of the stock material unit 300*c*. In the illustrated embodiment, narrower portion 503*c* of the strap assembly 500*c* may extend over two or more surfaces or faces of the three-dimensional body defined by the stock material. For example, the strap assembly 500*c* may include a portion 502*c* that extends along a portion of a face of the three-dimensional body, and the narrower portion 503*c* may extend along another portion 503*c*' of the same face as well as along a portion or an entire width (or length) of another face of the three-dimensional body. For example, a user or operator may have access to the narrower portion 503*c*, which may facilitate removal of the strap assembly 500*c* (e.g., the narrow portion 503*c* may be severed).

The portion 503*c*' may extend along the front face of the three-dimensional body by any suitable distance. For example, the portion 503*c*' may have a length in one or more of the following ranges: from 0.5 inch to 1.5 inch, from 1 inch to 2 inch, from 0.7 inch to 3 inches. The length of 503*c*' portion may be outside for the above-described range. Moreover, the portion 503*c*' may span a selected portion or percentage of the height of the front face of the three-dimensional body, which may be in one or more of the following ranges: from 5% to 15%, from 10% to 30%, from 25% to 50%. It should be appreciated that the length of the portion 503*c*' may be outside of the above-described percentage ranges.

As shown in FIG. 14, supporting the three-dimensional body of the stock material unit 300*b* on the supports 700*a*, 700*b*, 700*c* may form or define passageways 701*b* and 701*b*. For example, the passageways 701*a*, 701*b* may be suitably sized and shaped to facilitate the passage of the strap assemblies 500 therethrough. Moreover, the passageways 701*a*, 701*b* may be suitably positioned relative to periphery and/or center of gravity of the three-dimensional body of the stock material unit 300*b*. For example, the passageways 701*a*, 701*b* may facilitate positioning and/or aligning of the strap assemblies 500 relative to the three-dimensional body of the stock material unit 300*b* (e.g., as described above).

While, as described above, in some embodiments three supports may be used to wrap the three-dimensional body with the strap assemblies 500, additional or alternative embodiments may include fewer or more supports. For example, the three-dimensional body may be supported by a single support (e.g., by the support 700*a*). In other embodiments, the three-dimensional body may be supported by two support (e.g., by support 700*b* and 700*c*).

Furthermore, it should be appreciated that, generally, the three-dimensional body of any of the stack material units described herein may be, stored, transported, used in a dunnage conversion machine, or combinations thereof without any wrapping (or strapping) or with a different strap or wrapping than the strap assembly 500 (FIGS. 11A-11B). For example, a twine, paper, shrink-wrap, and other suitable wrapping or strapping material may secure together one or more sheets that define the three-dimensional body of any of the stock material unit described herein. Similarly, the above-described method and structure of supporting the three-dimensional body of the stock material unit may facilitate wrapping or three-dimensional body with any number of suitable wrapping or strapping materials and/or devices.

What is claimed is:

1. A stock material unit for a dunnage conversion machine, comprising:
- a stock material sheet that forms a three-dimensional body; and
- a strap wrapped about the three-dimensional body as a closed loop and having:
  - a load-spreading portion that has a first transverse width sufficient to distribute the weight of the three-dimensional body over the first transverse width to prevent or reduce damage to the three-dimensional body, wherein the first transverse width is less than a width of the three-dimensional body;
  - a handle portion that has a second transverse width that is smaller than the first transverse width, the handle portion being formed without overlapping elements, and being sized such that the handle portion is graspable by a user's hand;

a joining portion disposed on an opposite side of the handle portion from the load spreading portion and secured to the load spreading portion, thereby forming the closed loop, and wherein the load-spreading and handle portions are cooperatively configured to enable the three-dimensional body to be lifted from the handle portion.

2. The stock material unit of claim 1, wherein the stock material sheet includes a continuous sheet that is fanfolded to form a fanfold stack that includes a plurality of folds that define opposing faces stacked over each other.

3. The stock material unit of claim 2, wherein the continuous sheet of material includes a tapered sheet section positioned on a first face of the three-dimensional body exposed from the strap.

4. The stock material unit of claim 3, wherein the handle portion is disposed on the first face.

5. The stock material unit of claim 3, wherein:

the strap comprises a first strap at a first location and a second strap at a second location;

the handle portions of the first and second straps are disposed on the first face; and the tapered sheet section is exposed between the first and second straps.

6. The stock material unit of claim 5, further comprising a splice member affixed to the tapered sheet section between the handle portions of the and second straps, the splice member including an adhesive configured for splicing the tapered sheet section to another stock material unit placed on the three-dimensional body with sufficient strength so that the spliced stock material sheet of the other stock material unit fed into the dunnage conversion machine pulls the tapered sheet section into the dunnage conversion machine.

7. The stock material unit of claim 5, wherein the tapered section includes a tip that is located between the handle portions of the first and second straps.

8. The stock material unit of claim 1, wherein the second transverse width is at least 50% smaller than the first width.

9. The stock material unit of claim 1, wherein the handle portion spans across a peripheral face of the three-dimensional body.

10. The stock material unit of claim 1, wherein the strap includes fillets disposed at a transition handle portion and the load-spreading portion.

11. The stock material unit of claim 1, wherein the handle portion extends at least partially along a front face of the three-dimensional body.

12. The stock material unit of claim 1, wherein the strap is in contact with four peripheral faces of the three-dimensional body.

13. The stock material unit of claim 1, wherein the strap is sufficiently narrower than the width of the three-dimensional body to expose most of the three-dimensional body.

14. The stock material unit of claim 1, wherein the load-spreading portion of the strap is secured to the joining portion of the strap with sufficient strength so that the strap can carry the weight of the three-dimensional body to retain the dunnage in the stock material unit configuration.

15. The stock material unit of claim 1, wherein:

the strap comprises a first strap at a first location and a second strap at a second location, the handle portions of the first and second straps are disposed on the first face.

16. The stock material unit of claim 15, wherein the first strap and the second strap are sufficiently narrower than the width of the three-dimensional body to expose most of the three-dimensional body.

17. The stock material unit of claim 1, further comprising a splice member that includes an adhesive configured for splicing the stock material sheet of the three-dimensional body to another stock material unit placed on the three-dimensional body with sufficient strength so that the spliced stock material sheet of the other stock material unit fed into the dunnage conversion machine pulls the stock material sheet of the three-dimensional body into the dunnage conversion machine.

18. The stock material unit of claim 1, wherein the load-spreading portion of the strap extends around at least two corners of the three-dimensional body to distribute the weight of the three-dimensional body over the first transverse width at least at the plurality of corners to prevent or reduce damage to the three-dimensional body.

19. The stock material unit of claim 18, wherein the load-spreading portion of the strap extends across a second face of the three-dimensional body opposite on an opposite side of the three-dimensional body from the first face.

20. The stock material unit of claim 1, wherein the load-spreading portion of the strap has a length that is long enough to extend around a plurality of corners of the three-dimensional body to distribute the weight of the three-dimensional body over the first transverse width at least at the plurality of corners to prevent or reduce damage to the three-dimensional body.

21. The stock material unit of claim 1, wherein the joining portion is disposed at a first end of the strap.

22. The stock material unit of claim 21, wherein the load-spreading portion is disposed at a second end of the strap, opposite from the first end.

23. The stock material unit of claim 1, wherein the joining portion has a third transverse width that is wider than the second transverse width.

24. A stock material unit for a dunnage conversion machine, comprising:

a stock material sheet that forms a three-dimensional body; and a first strap and a second strap positioned on opposite sides of a center of gravity of the three-dimensional body, each strap wrapped about the three-dimensional body as a closed loop and having:

a load-spreading portion that has a first transverse width sufficient to distribute the weight of the three-dimensional body over the first transverse width to prevent or reduce damage to the three-dimensional body; and a handle portion that has a second width that is smaller than the first width and is sized such that the handle portion is graspable by a user's hand;

wherein the load-spreading and handle portions are cooperatively configured to enable the three-dimensional body to be lifted from the handle portion.

25. A method of assembling a stock material unit for a dunnage conversion machine, the method comprising:

providing a three-dimensional body formed by a fanfolded stock material sheet that is configured for crumpling to convert the stock material sheet into dunnage by a dunnage conversion machine; and wrapping a strap about the three-dimensional body to position:

a load-spreading portion of the strap extending around a plurality of corners of the three-dimensional body, the load-spreading portion having a first transverse width sufficient to distribute the weight of the three-dimensional body over the first transverse width at least at the plurality of corners to prevent or reduce damage to the three-dimensional body, wherein the first transverse width is less than a width of the three-dimensional body;

a handle portion that has a second transverse width that is smaller than the first transverse width, the handle portion being formed without overlapping elements, and being sized such that the handle portion is graspable by a user's hand; and a joining portion disposed on an opposite side of the handle portion from the load spreading portion and secured to the load spreading portion, thereby forming the closed loop, and affixing ends of the strap to each other to secure the strap about the three dimensional body to enable the three-dimensional body to be lifted from the handle portion.

* * * * *